(12) United States Patent
Alfano et al.

(10) Patent No.: US 7,106,972 B2
(45) Date of Patent: Sep. 12, 2006

(54) METHODS OF IMPROVING LINE OF SIGHT WIRELESS OPTICAL COMMUNICATION THROUGH ADVERSE ENVIRONMENTAL CONDITIONS

(75) Inventors: Robert R. Alfano, Bronx, NY (US); Jin Pin Ying, Fresh Meadow Lane, NY (US); Swapan K. Gayen, Marlboro, NJ (US); Wei Cai, Bronx, NY (US)

(73) Assignee: The Research Foundation of the City University of New York, New York, NY (US)

( * ) Notice: Subject to any disclaimer, the term of this patent is extended or adjusted under 35 U.S.C. 154(b) by 607 days.

(21) Appl. No.: 10/116,194

(22) Filed: Apr. 4, 2002

(65) Prior Publication Data

US 2003/0048499 A1    Mar. 13, 2003

Related U.S. Application Data

(60) Provisional application No. 60/281,437, filed on Apr. 4, 2001.

(51) Int. Cl.
*H04B 10/00* (2006.01)
(52) U.S. Cl. .................. 398/158; 398/159; 398/119
(58) Field of Classification Search ........ 398/118–131, 398/158–161
See application file for complete search history.

(56) References Cited

U.S. PATENT DOCUMENTS

| | | |
|---|---|---|
| 5,140,463 A | 8/1992 | Yoo et al. |
| 5,371,368 A | 12/1994 | Alfano et al. |
| 5,710,429 A | 1/1998 | Alfano et al. |
| 5,719,399 A * | 2/1998 | Alfano et al. ............ 250/341.3 |
| 5,813,988 A | 9/1998 | Alfano et al. |
| 5,847,394 A | 12/1998 | Alfano et al. |
| 5,929,443 A | 7/1999 | Alfano et al. |
| 6,108,576 A | 8/2000 | Alfano et al. |

OTHER PUBLICATIONS

Yoo and Alfano, "Time-resolved coherent and incoherent components of forward light scattering in random media", Opt. Lett. 15, 320 (1990).
Wang et al., "Ballistic 2-D Imaging Through Scattering Walls Using An Ultra Fast Kerr Gate", Science 253, 769 (1991).
Gayen and Alfano, "Emerging Optical Biomedical Imaging Techniques", Opt. Photon. News 7(3), 22 (1996).
Dolne, et al., "IR Fourier Space Gate and Absorption Imaging Through Random Media", Lasers Life Sci. 6, 131 (1994).
Demos and Alfano, "Temporal gating in highly scattering media by the degree of optical polarization", Opt. Lett. 21, 161 (1996).
Cai et al., "Analytical Solution of the Elastic Boltzmann Transport Equation in an Infinite Uniform Medium Using Cumulant Expansion", J. Phys. Chem B104, 3996 (2000).
Cai et al., "Analytical Solution of the polarized photon transport equation in an infinite uniform medium using cumulant expansion", Phys. Rev. E63, 166606 (2001).

* cited by examiner

Primary Examiner—Agustin Bello
(74) Attorney, Agent, or Firm—Dilworth & Barrese LLP

(57) ABSTRACT

A method of improving a signal-to-noise (S/N) ratio for a light signal transmitted by wireless optical communication through adverse environmental conditions, the light signal including a snake component and a ballistic component for carrying coded information, and a diffusive component that adds to background noise, the method comprising the steps of: encoding information to be transmitted by the light signal, wherein the light signal is one of a serial train of code pulses or a modulated light beam; selecting an appropriate wavelength for the encoded light signal; transmitting the encoded light signal though the adverse environmental conditions; receiving the encoded light signal; sorting the received encoded light signal to preferentially select the information carrying components and reduce the diffusive component; and detecting the sorted encoded light signal with a photo-detector.

33 Claims, 20 Drawing Sheets

(A)

(B)

(C)

(a)

(b)

(a)

(b)

(a)

(b)

(a)

(b)

(a)

(b)

METHODS OF IMPROVING LINE OF SIGHT WIRELESS OPTICAL COMMUNICATION THROUGH ADVERSE ENVIRONMENTAL CONDITIONS

PRIORITY

This application claims priority to a provisional application entitled "Methods to Improve Line of Sight Wireless Optical Communication Through Adverse Environmental Conditions" filed in the United States Patent and Trademark Office on Apr. 4, 2001 and assigned U.S. Ser. No. 60/281,437, the contents of which are hereby incorporated by reference.

BACKGROUND OF THE INVENTION

1. Field of the Invention

The present invention relates generally to a method of wireless data transmission, and in particular, to a method for improving a signal-to-noise ratio (S/N) and enhancing the information fidelity of high-bit-rate wireless optical communication signals transmitted through adverse atmospheric and environmental conditions.

2. Description of the Related Art

The present invention teaches techniques to improve wireless optical communication through adverse environmental conditions, such as clouds, fog, smog, and smoke in the atmosphere, and murky water.

Wireless communication systems today rely on microwave or radio frequency pulse rates. The bandwidth with these types of transmissions is limited and higher rates are required. Light transmission offers much higher bandwidth and speed advantages, and is now being used in telecommunications using optical fibers. Currently, an optical fiber network transmits data at a rate of 40 Gigabits/sec and will soon attain 100 Gigabits/sec rate. However, for free-space line-of-sight wireless optical communication, such as satellite-to-ground, ground-to-satellite, and ground-to-ground transmission of optical data and signals one needs to overcome the deleterious effects of signal attenuation and signal-to-noise ratio (S/N) reduction caused by multiple scattering and absorption by the transmission conditions, such as clouds, fog, smoke, smog and murky water in the environment.

As an ultra short pulse (pulse width from picoseconds to femtoseconds) of light transits through a turbid medium, the temporal profile of the pulse broadens due to scattering by the suspension of microscale particles in the medium. In the case of light pulse propagation through the atmosphere, these microscale particles could be the water droplets in the cloud. Scattering arises from the variation in the local index of refraction between the air molecules in the atmosphere and water droplets in the cloud. The temporal broadening of pulses causes adjacent pulses (in the coded pulse train used for high-speed optical communication) to overlap with one another leading to clutter and information mutilation. The present invention provides methods for overcoming this type of problem and extracting useful information based on a detailed understanding of the characteristics of the broadened pulse.

It has been pointed out (U.S. Pat. No. 5,371,368 issued Dec. 6, 1994 to Alfano et. al.; Yoo and Alfano, "Time-Resolved Coherent And Incoherent Components Of Forward Light Scattering In Random Media," Opt. Lett. 15, 320 (1990); Wang et al. "Ballistic 2-D Imaging Through Scattering Walls Using An Ultra Fast Kerr Gate", Science 253, 769 (1991)), that the broadened pulse comprises ballistic (coherently scattered in the incident direction), snake (paraxially scattered in the incident direction) and diffusive (multiply scattered in all directions) components (or photons), as illustrated in FIG. 1. The relative magnitude of the three components depends on the properties of the turbid medium (such as, the size and distribution of microscale scattering particles, the variation in the relative index of refraction between the suspended microscale particles (e.g., water droplets) and the intervening medium (e.g., air), scattering length, $l_s$, and absorption length, $l_a$) and the distance through which light travels in it. The key parameters that describe the propagation of light through a scattering medium are: the scattering length, $l_s$ which is the average distance between two consecutive scattering processes, the transport mean free path, $l_t = l_s/(1-g)^{-1}$, where $g = <\cos \theta = s \cdot s'>$ is the anisotropy factor, the average being over the phase function $P(s, s')$, and the absorption length, $l_a$ which is the average distance over which a photon is absorbed. The transport mean free path is a parameter that describes the randomization of the direction as the incident light propagates through a turbid medium. One also defines the total attenuation length, $l_T$ that is related to $l_s$ and $l_a$ by the relation $l_T^{-1} = l_s^{-1} + l_a^{-1}$. Another relevant parameter is the visibility, or visual range, $S_v$. Qualitatively, it is the maximum distance from which an object can be seen by the normal human eye, and is determined primarily by the object's visual contrast with respect to the background. The minimum brightness contrast that the average human eye can distinguish is about 2%. Therefore, the visibility is equal to the distance at which the apparent brightness of the object differs by 2% from the brightness of the background. This criterion leads to visibility, $S_v = 3.912 \, l_T$.

A ballistic component retains the coded information and is ideal for line-of-sight wireless optical communication. Snake components carry information whose fidelity depends on the temporal slice of the broadened pulse used. Diffuse components contribute to the noise and information mutilation. The early light comprising of the ballistic and snake components is of interest for application in free-space optical communication, and as such, a major concern of the present invention is to provide methods for sorting it out.

The situation is somewhat different for longer pulses, that is, those with a duration of a nanosecond or longer than with the ultra short pulse as described above. For these pulses the diffusive component of the earlier parts of a pulse overlap with the later parts of the same pulse. The overall broadening is not as much (3 to 4 orders of magnitude for picosecond and subpicosecond pulses) as that for ultra short pulses, so the signal (ballistic and snake components) and noise (diffusive component) are not as isolated in time as illustrated in FIGS. 1 and 2, but are overlapped. The present invention pertains to improving signal-to-noise ratio of optical communication signals transmitted using nanosecond and longer pulses as well.

The intensity of the ballistic component ($I_b$) as a function of distance z that it travels in a turbid medium is given by Equation 1:

$$I_b \cong I_0 \exp(-z/l_s) \exp(-z/l_a) \qquad (1)$$

where, $I_0$ is the incident intensity. The ballistic pulse retains its original direction and the average distance it travels in passing through a turbid medium of thickness L is $$Z_B \cong L \qquad (2)$$

in ballistic time $$\tau_B = nL/c \qquad (3)$$

where n is the index of refraction of the medium.

The relative magnitude of the diffusive component is orders of magnitude larger than that of the ballistic component for highly scattering media and its temporal profile is much broader. The diffusive components travel an average distance ($Z_D$) of as shown in Equation 4a.

$$Z_D = nL^2/2l_t \quad (4a)$$

in an average travel time of $$\tau_D = nL^2/2l_t c \quad (4b)$$

in transiting through a medium of length L.

Table 1 shows transit times for ballistic and diffusive components for traveling different distances L in media with $L/l_t = 20$. In Case 2, the diffusive energy from a pulse is spread over a long time (~100 nsec) with $10^{-4}$ of energy as compared to a ballistic 10 ps window. In Case 3, the diffusive component spreads

TABLE 1

Ballistic and diffusive average times

| Conditions | Case 1 | Case 2 | Case 3 |
|---|---|---|---|
| Time | $L/l_t = 20$ | $L/l_t = 20$ | $L/l_t = 20$ |
|  | L = 5 cm | L = 12 feet = 3.56 m | L = 50 m |
| $\tau_D$ | 1.6 nsec | 118 nsec | 1.66 μsec |
| $\tau_B$ | 160 ps | 12 ns | 166 nsec | out even further (~1.66 μs) and peak intensity giving $10^{-9}$ overall reduction in the ballistic 10 ps window. The signal can be time gated to select out the ballistic component. For a train of pulses, the broadened diffusive wing of each pulse will overlap with some of the following pulses in the train causing clutter and masking of coded information. For thick medium, the peak of scattered pulse is delayed (see FIG. 2).

There are several salient features of the transmitted light pulse that can be used to sort out the early light and improve the signal-to-noise ratio, S/N. First, the ballistic peak and diffusive peak are shifted in time as illustrated schematically in FIGS. 1 and 2. The ballistic peak arrives at the ballistic time, $\tau_B = nL/c$, while the diffusive peak arrives at $\tau_D = nL^2/2l_t c$. The larger the value of L, the higher the separation between $\tau_B$ and $\tau_D$ will be. One can use a time gate (U.S. Pat. No. 5,140,463 issued Aug. 18, 1992 to Alfano et. al.; U.S. Pat. No. 5,371,368 issued Dec. 6, 1994 to Alfano et. al.; Gayen and Alfano, "Emerging Optical Biomedical Imaging Techniques," Opt. Photon. News 7(3), 22 (1996)) that opens for a short interval to let the early light through, and close in time to effectively block the diffusive light.

Second, the diffusive components travel longer distances within the scattering medium than the ballistic components, and are absorbed more. A judicious selection of the wavelength enables one to reduce the diffusive components more preferentially than the ballistic components, thus enhancing the S/N. The selection of the wavelength is critical. For transmission through clouds, the wavelength needs to be near the absorption resonances of water droplets, and wavelengths near water absorption resonances in the 800–1600 nm range are possible choices.

Third, the time zone between the ballistic peak and the onset of a diffusive component defined as the information zone in FIG. 1 provides a time window to transport data encoded in a two-dimensional (2-D) parallel array instead of a serial transmission.

Fourth, the directionality of the ballistic and snake components may be used to spatially filter out the ballistic and snake components and to reduce the diffusive components. Ballistic components propagate in the incident direction, snake components deviate slightly from but are centered around the incident direction, while the diffusive components deviate farther from the incident direction. It has been shown (U.S. Pat. No. 5,710,429 issued Jan. 20, 1998 to Alfano et. al.; Dolne et. al. "IR Fourier Space Gate And Absorption Imaging Through Random Media," Lasers Life Sci. 6, 131 (1994)) that a Fourier space gate is effective in preferential transmission of the early light characterized by low spatial frequencies, and rejection of diffusive light with higher spatial frequencies.

The polarization property of light provides an added advantage of sorting out useful early light from the noise generated by the diffusive light and the background light consisting of natural light from the sun, the moon, the stars, and other man-made sources. The background light is generally unpolarized. Scattering events depolarize an incident beam of polarized light. Consequently, if the incident light pulse is polarized, the polarization states of the different components of the transmitted pulse will be different. The ballistic component retains its original polarization, and the snake component remains partially polarized, while the multiple scattered diffusive component becomes depolarized. It has been shown (U.S. Pat. No. 5,719,399 issued Feb. 17, 1998 to Alfano et. al.; U.S. Pat. No. 5,847,394 issued Dec. 8, 1998 to Alfano et. al.; U.S. Pat. No. 5,929,443 issued Jul. 27, 1999 to Alfano et. al.; and Demos and Alfano "Temporal Gating In Highly Scattering Media By The Degree Of Optical Polarization," Opt. Lett. 21,161 (1996)) that a polarization gate that selects out light of preferred polarization is effective in sorting out early light and discriminating against the diffusive light.

The present invention involves use of a single or a combination of different enabling characteristics of light, such as, wavelength, polarization, pulse duration, as well as selective optimal absorption of light by the intervening turbid medium to reduce the deleterious effect of scattering and enhance the relative magnitude of the information-bearing light. Time, polarization, and space gates, together with wavelength selection for optimizing reduction of noise by absorption will be used for improvement of high-bit-rate, line-of-sight wireless optical communication.

SUMMARY OF THE INVENTION

It is an objective of the present invention to provide methods of improving a signal-to-noise ratio (S/N) and enhancing an information fidelity of high-bit-rate wireless optical communication signals transmitted through adverse atmospheric conditions.

It is another objective of the present invention to utilize parallel ballistic transportation of optical signals as a series of 2-D ballistic/snake maps.

It is yet another object of the present invention to provide a theoretical formalism and an algorithm to extract information contained in ballistic and snake components of a transmitted light signal.

The above and other objects of the present invention are achieved by the following methods. In a first method of improving a signal-to-noise (S/N) ratio for a light signal transmitted by wireless optical communication through adverse environmental conditions, the light signal including a snake component and a ballistic component for carrying coded information, and a diffusive component that adds to background noise, the method comprising the steps of: encoding information to be transmitted by the light signal, wherein the light signal is one of a serial train of code pulses or a modulated light beam; selecting an appropriate wavelength for the encoded light signal; transmitting the encoded light signal though the adverse environmental conditions; receiving the encoded light signal; sorting the received encoded light signal to preferentially select information carrying components and reduce the diffusive component; and detecting the sorted encoded light signal with a photo-detector.

In an alternative method of improving a signal-to-noise ratio for a light signal transmitted by wireless optical communication through adverse environmental conditions, the light signal includes a snake component and a ballistic component for carrying coded information, and a diffusive component that adds to background noise, the method comprises the steps of: encoding information to be transmitted by the light signal, wherein the light signal is encoded in parallel in a 2-D array; selecting an appropriate wavelength for the encoded light signal; transmitting the encoded light signal through the adverse environmental conditions; receiving the transmitted encoded light signal; sorting the received encoded light signal to preferentially select information carrying components and reduce the diffusive component; and detecting the sorted encoded light signal with a photo-detector.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
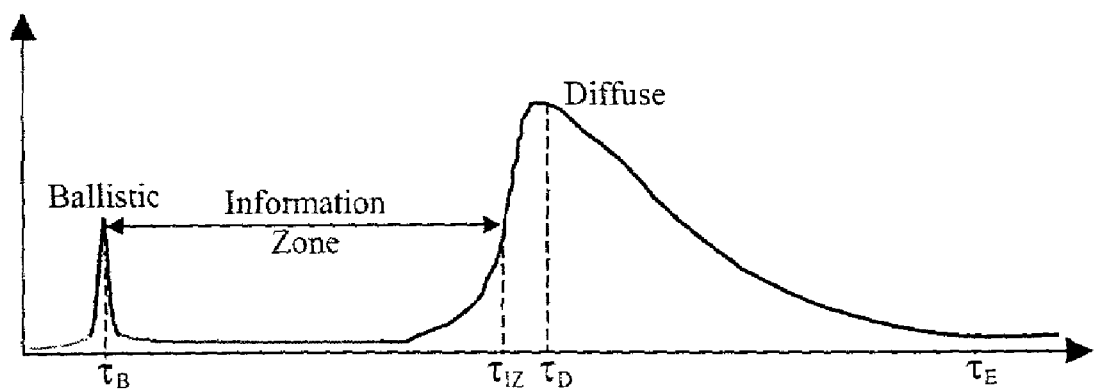
FIG. 1 is a graph illustrating a temporal profile of a light pulse transmitted through a scattering medium showing the ballistic, snake, and diffusive components.

Preferred embodiments of the present invention will be described herein below with reference to the accompanying drawings. In the following description, well-known functions or constructions are not described in detail since they would obscure the invention in unnecessary detail.

The present invention provides methods of improving wireless optical communication through adverse environmental conditions, such as clouds, fog, smog, and smoke in the atmosphere, and murky water in the sea. The information is encoded using light of appropriate wavelengths, and is transmitted as a serial train of data, or in parallel as a two-dimensional array. When transferred, light undergoes multiple scattering by the local inhomogeneities in the index of refraction due to the presence of scattering particles in clouds, fog, smog, smoke, water, and aerosol that may be present in the environment. Scattering breaks up light into ballistic, snake, and diffusive components. The early light, comprising ballistic and snake components, carries the coded information, but the information gets jumbled in the diffusive light because of the overlap between light carrying different bits of information. Diffusive light adds to the noise background, as does the light from other sources, such as the sun, the moon, the stars, and sources people use (e.g., street lights).

The present invention reduces the noise contributed by the diffusive light and the background light, and enhances the relative magnitude of the information-bearing early light relative to the diffusive light, so that the overall signal-to-noise ratio improves. Spatial, temporal, and polarization characteristics of the early and diffusive light, and the optical and spectroscopic properties of the intervening medium and microscale scattering particles suspended in the media, are used to accomplish this objective. The present invention utilizes time gating, space gating, and polarization filtering to sort out early light (the information carrying components) from the diffusive light. The present invention expounds the selection of appropriate wavelengths (usually in a 800–1800 nm range) as another advantageous parameter to capitalize on the absorption of light by the intervening medium, and/or by the microscale scattering particles for enhancing the signal-to-noise ratio (S/N). Diffusive photons traverse longer distances and get absorbed more than the ballistic and snake photons leading to the increase in the S/N ratio.

Also, the present invention teaches a theoretical formalism and provides an algorithm based on the analytical solution of a radiative transfer equation in an infinite uniform medium to extract the information contained in ballistic and snake components of the pulse profile. The algebraic expression of the spatial cumulants of the photon distribution function at any angle and time is valid for both unpolarized and polarized radiation, exact up to an arbitrary high order. In a preferred embodiment software is utilized to compute the radiation distribution with high accuracy and speed to extract information carried by the radiation.

An improvement in the S/N ratio is achieved by reducing a magnitude of the noise contributed by the diffusive and background light, and increasing the relative magnitude of the ballistic and snake light over the diffusive light. In a preferred method, an effective extraction of the ballistic and snake components of the optical signal and suppression of the diffusive component are achieved by time gating, space gating, polarization discrimination, and judicious wavelength selection.

The basic idea behind time gating is to open a fast shutter to let the early light in and close the shutter in time to block out the late arriving diffusive light. Realization of this idea in practice using different schemes, such as a streak camera, an optical Kerr gate, or a second harmonic cross correlation gate, has been accomplished for ultra fast light pulses propagating through model turbid media (U.S. Pat. No. 5,371,368 issued Dec. 6, 1994 to Alfano et. al.; Gayen and Alfano, "Emerging Optical Biomedical Imaging Techniques," Opt. Photon. News 7(3), 22 (1996)), as well as for 2-D and 3-D imaging through turbid media (U.S. Pat. No. 5,813,988 issued Sep. 29, 1998 to Alfano et. al.; U.S. Pat. No. 6,108,576 issued Aug. 22, 2000 to Alfano et. al.). The present invention extends the idea of time gating to the acquisition of line-of-sight wireless optical communication signal with better signal-to-noise ratio.

Using of a polarization gate for extracting early light and 2-D imaging though model and biomedical media has been demonstrated (U.S. Pat. No. 5,719,399 issued Feb. 17, 1998 to Alfano et. al.; U.S. Pat. No. 5,847,394 issued Dec. 8, 1998 to Alfano et. al.; U.S. Pat. No. 5,929,443 issued Jul. 27, 1999 to Alfano et. al.; and Demos and Alfano "Temporal Gating In Highly Scattering Media By The Degree Of Optical Polarization," Opt. Lett. 21, 161 (1996)). The present invention builds on these teachings and extends them further.

Figure 3:
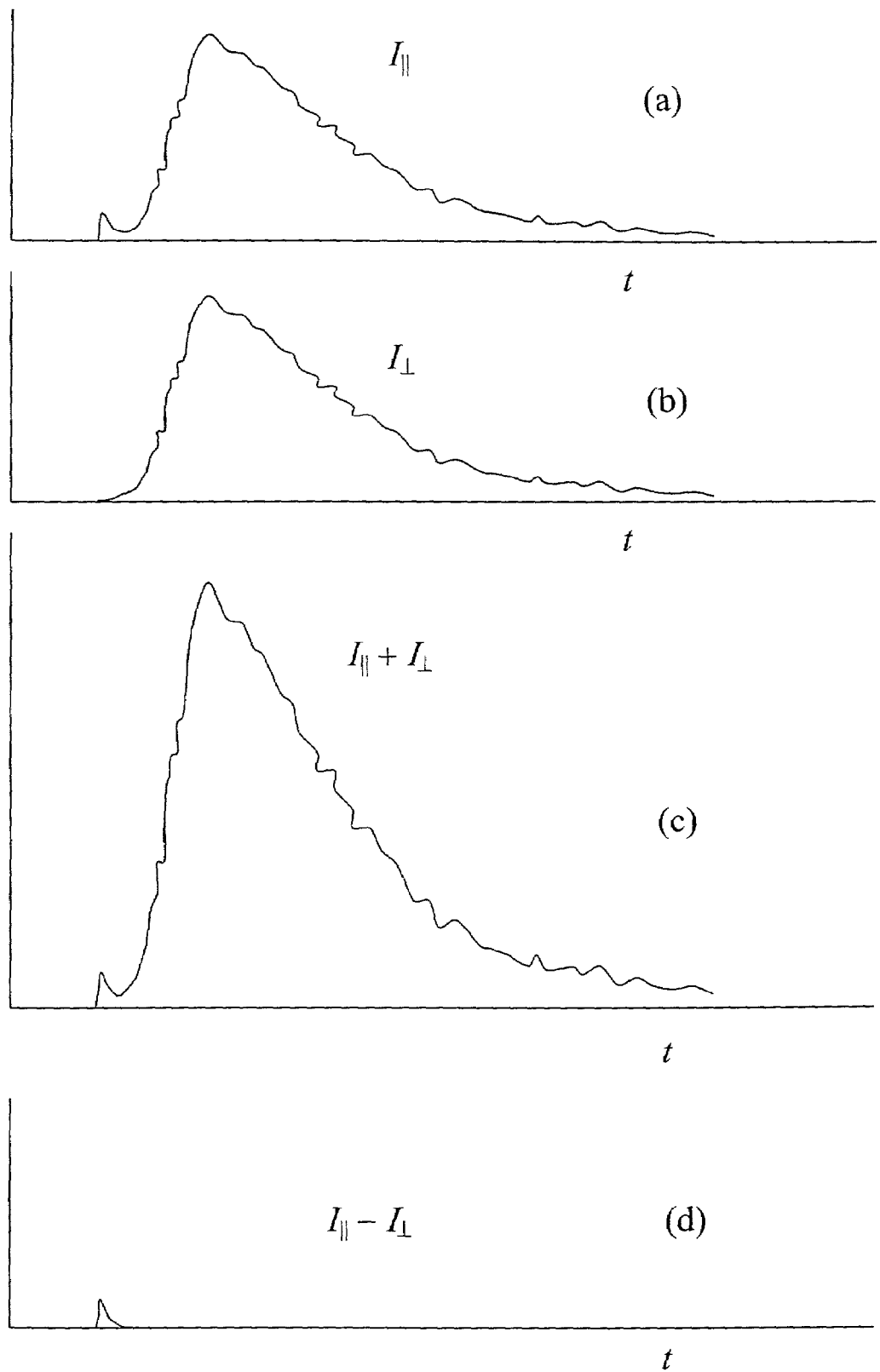
FIG. 3A is a graph illustrating a temporal profile of a component parallel to the incident polarization $I_\parallel(t)$ of the transmitted light.
FIG. 3B is a graph illustrating a temporal profile of a component perpendicular to the incident polarization $I_\perp(t)$ of the transmitted light.
FIG. 3C is a graph illustrating a temporal profile of a total intensity $I_\parallel(t)+I_\perp(t)$ of the transmitted light.
FIG. 3D is a graph illustrating a temporal profile of a polarization analysis $\Delta I(t)=I_\parallel(t)-I_\perp(t)$ of the transmitted light.
Figure 4:
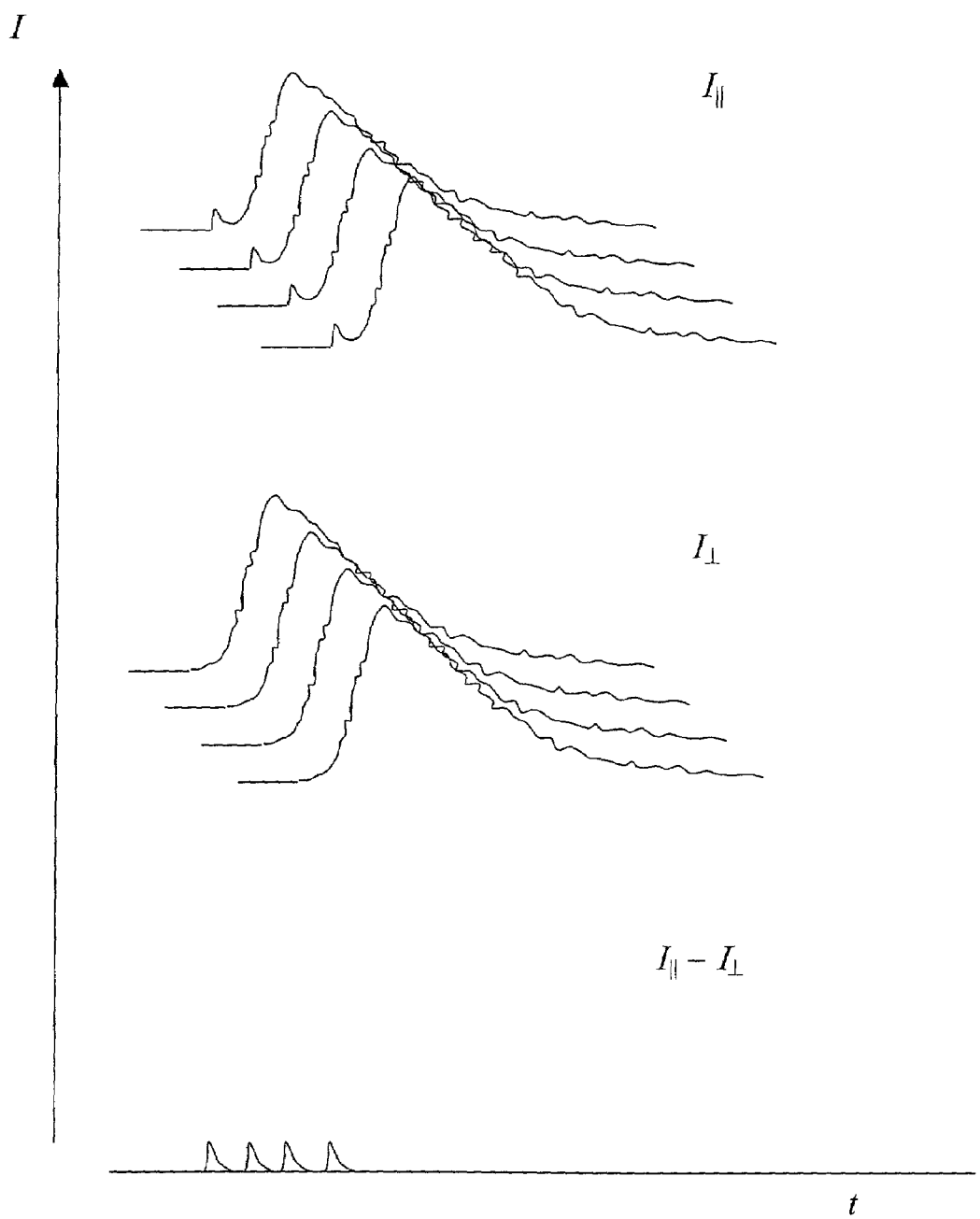
FIG. 4 is a graph illustrating an extraction of a useful signal transmitted using a series of pulses using polarization analysis $\Delta I(t)=I_\parallel(t)-I_\perp(t)$.

A preferred method involves transmission of a signal using polarized (e.g., linear) light pulses and measurement of the temporal profiles of the transmitted signal components polarized parallel, $I_\parallel(t)$ and perpendicular, $I_\perp(t)$ to that of the incident polarization at the receiver end. The parallel component, $I_\parallel(t)$ itself has a much better S/N when compared to the case where polarization filtering is not used at all. Further enhancement in S/N is obtained if the difference between parallel and perpendicular components is used. The polarization difference profile, $\Delta I(t)=I_\parallel(t)-I_\perp(t)$, ideally should be zero for the depolarized diffusive component of the signals and the background light, and non-zero for the ballistic and snake light. FIG. 3 schematically illustrates the temporal profiles of the components for $L/l_t \gg 1$, for (a) the parallel component $I_\parallel(t)$, (b) the perpendicular component $I_\perp(t)$, (c) the total intensity $I_\parallel(t)+I_\perp(t)$, and (d) $\Delta I(t)=I_\parallel(t)-I_\perp(t)$. Noise from background natural light is illustrated in FIGS. 3A–C, but is cancelled in FIG. 3D. FIG. 4 illustrates the use of time-gated polarization filtering for a series of pulses.

Figure 5:
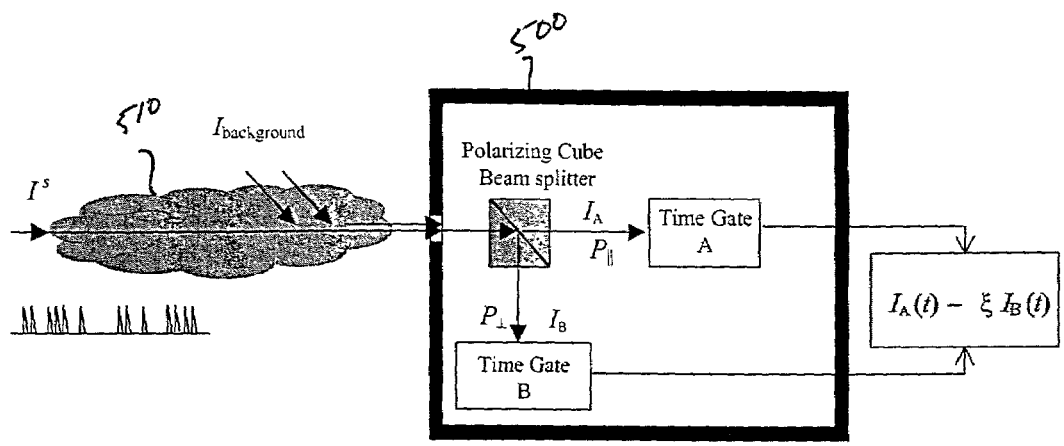
FIGS. 5A, 5B, and 5C are experimental embodiments of a receiver end illustrating time-gated polarization analysis eliminating diffusive components in the optical signal and background natural light.
Figure 5:
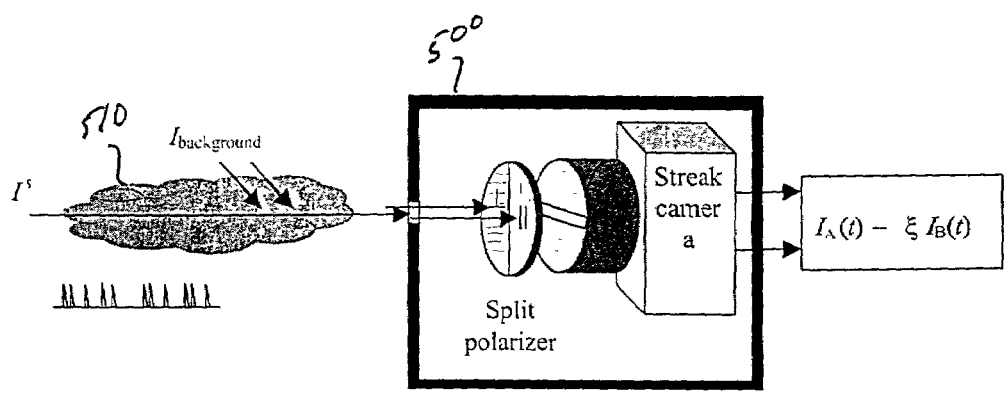
Figure 5C:
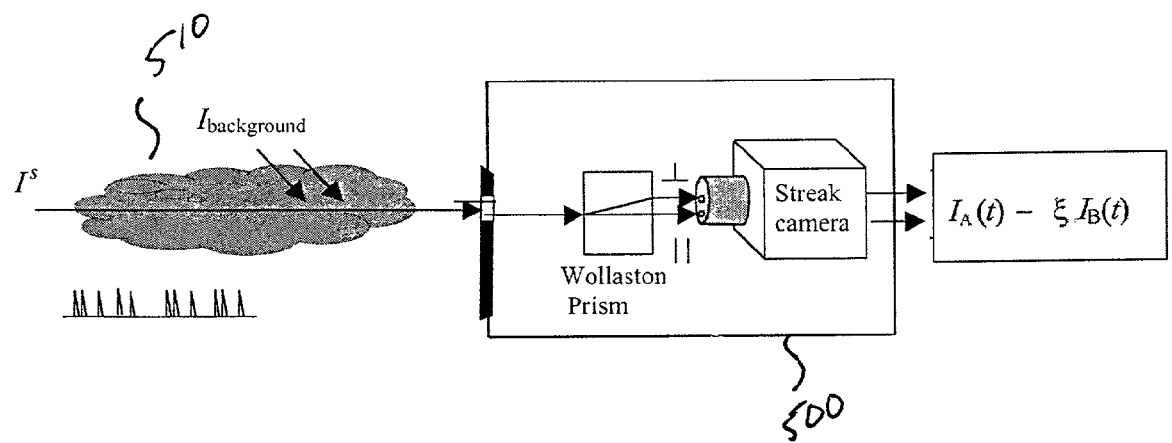

In order to achieve the theoretical limit of cancellation, the parallel and perpendicular components need to be measured simultaneously with high accuracy, and proper subtraction procedure needs to be followed. FIGS. 5A–C schematically illustrate an experimental arrangement of a time and polarization gated optical receiver system. Referring to FIGS. 5A–C, encoded pulses traverse through the scattering medium 510 and arrive at the receiver 500 equipped with a polarizing beam-splitter (or Wollaston Prism) and two photo-detectors (streak camera, photodiodes, gated intensified CCD cameras). The polarizing beam-splitter splits the beam into a parallel-polarized component and a perpendicular-polarized component. In an ideal experimental condition, for the diffusive components of signals and the background light, the intensities in two beams, $I_A$ and $I_B$ should be equal, and should be different for the ballistic and snake components. In a real experimental condition, a calibration factor $\xi$ may have to be introduced to account for variations in the two component arms. The value of $\xi$ is determined by requiring $I_A - \xi I_B = 0$ using a completely unpolarized test light pulse into the receiving system.

The present invention also discloses a novel theoretical method for computing a temporal profile of light signals at a receiving station. Specifically, this method makes a quick and accurate estimation of the early light components when the receiving station is located far from the transmitting station. No other currently available theoretical methods can make this estimation. This method is based on an analytical solution of time-dependent scalar (describing unpolarized light) and vector (describing polarized light) radiative transfer equations in an infinite uniform scattering medium (Cai et. al., "Analytical Solution Of The Elastic Boltzmann Transport Equation In An Infinite Uniform Medium Using Cumulant Expansion," J. Phys. Chem. B 104, 3996 (2000); "Analytical Solution Of The Polarized Photon Transport Equation In An Infinite Uniform Medium Using Cumulant Expansion," Phys. Rev. E 63, 16606 (2001)).

Another method of the present invention uses spatial filtering that makes use of the fact that ballistic light propagates in an incident direction, and that snake light deviates only slightly from the incident direction, while the diffusive light may be scattered in all directions. One of the simplest means for implementing a space gate is to place an aperture centered on the line of incidence. The ballistic light and the desired fraction of the snake light are then selected by varying the size of the aperture.

Figure 6:
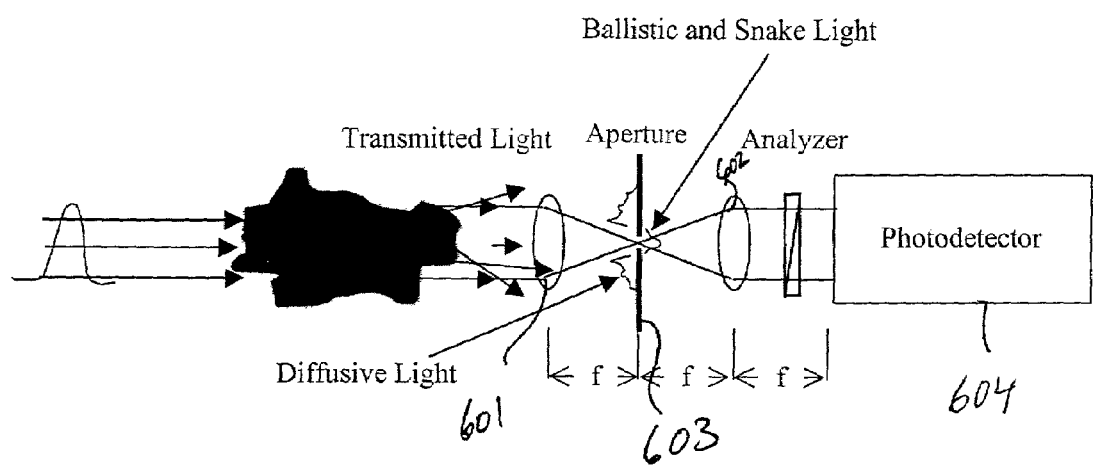
FIG. 6 illustrates a 4f Fourier spatial filtering embodiment for reducing a diffusive component.

A more sophisticated embodiment that is particularly useful when image and/or 2-D encoded data are to be transmitted includes a Fourier space gate at the receiving end. A schematic diagram of a 4f Fourier space gate is illustrated in FIG. 6. Referring to FIG. 6, the arriving signal is collected with a lens 601 of focal length f, which directs the light towards an aperture 603 placed at its back focal plane with center of the aperture 603 at the focus. The aperture 603 selects out the lower spatial-frequency ballistic and snake components of the signal that are then collimated by the second lens 602, also of focal length f, placed at a distance of f from the aperture, and then passed into the photo-detector 604. The ballistic light, and a desired fraction of the snake light are sorted out by adjusting the size of the aperture.

The use of absorption to reduce the diffusive light to a greater extent than the ballistic and snake light, while maintaining adequate signal level, requires careful selection of the wavelengths used in transmission of signals. The wavelengths closer to the water absorption bands, and absorption bands of active species (or the interfering particles) in aerosol and smog need be used to exploit the absorption advantage. This idea of using judicious absorption to reduce noise is in distinct contrast with the existing practice that avoids light of wavelengths that get absorbed by atmospheric entities, such as water droplets in the cloud.

Figure 7:
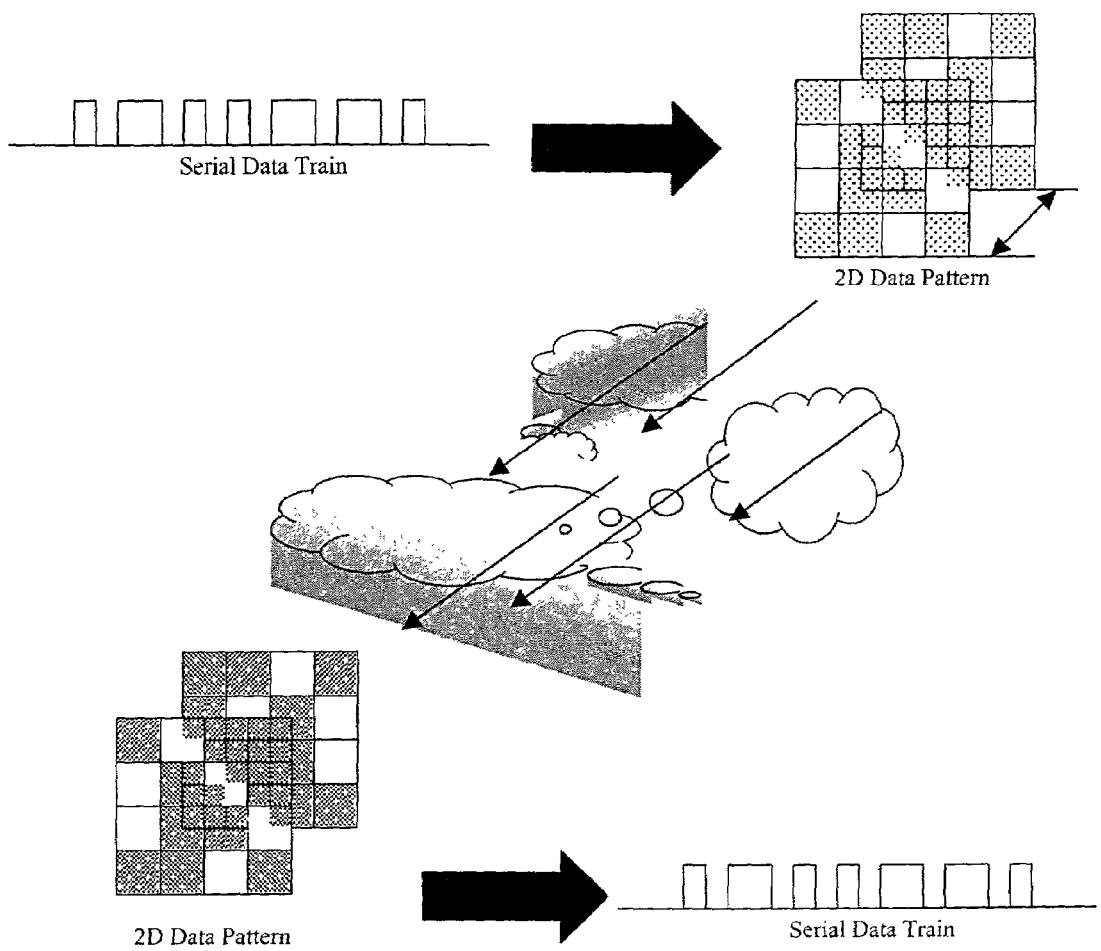
FIG. 7 is a diagram illustrating a method of converting a serial data train to 2-D parallel image data for ballistic transmission, and converting the transmitted parallel data received by a detector back to a serial data stream.

As stated above, another object of the present invention is the parallel ballistic transport of optical signals as a series of 2-D ballistic/snake maps. The optical signals to be transmitted are encoded in an N×N 2-D array, as illustrated schematically in FIG. 7, where N can be as large a number as the number of pixels in a CCD (Charge-Coupled Device) chip. A serial stream of data information of 1's and 0's is encoded into a parallel 2-D image burst. A larger number of pixels, such as, $4 \times 10^3 \times 4 \times 10^3 = 1.6 \times 10^7$ is possible. This encoded 2-D information is transmitted as an optical image burst. A 2-D imaging detector at the receiving end captures the information. The detector may be time gated to capture the ballistic component of the 2-D signal array. The gating methods discussed above may also be implemented at the receiving end individually or in a combination to discriminate against the diffusive components. The 2-D parallel array is then decoded back into serial bits for the user. An entire communication may be broken down into several 2-D parallel arrays, and transmitted as 2-D images. Buffer arrays can be used to account for any time delay in transmitting or demodulating the data.

A method of operation is as follows. The information starts as serial data. It is then converted into a parallel 2D image data array for wireless optical transmission. The 2-D image data is detected using techniques that sort out early light and discriminate against diffusive light. The detected 2-D image data is then converted back to serial data. After a time when the diffusive profile from the previous array has decayed down, another serial data stream is stacked into a 2D image for optical ballistic wireless transmission. In this manner, no coded information is lost. The data follows as serial→parallel 2-D image→serial. The sequence is repeated for consecutive batches of data, as displayed schematically in FIG. 7.

Figure 8:
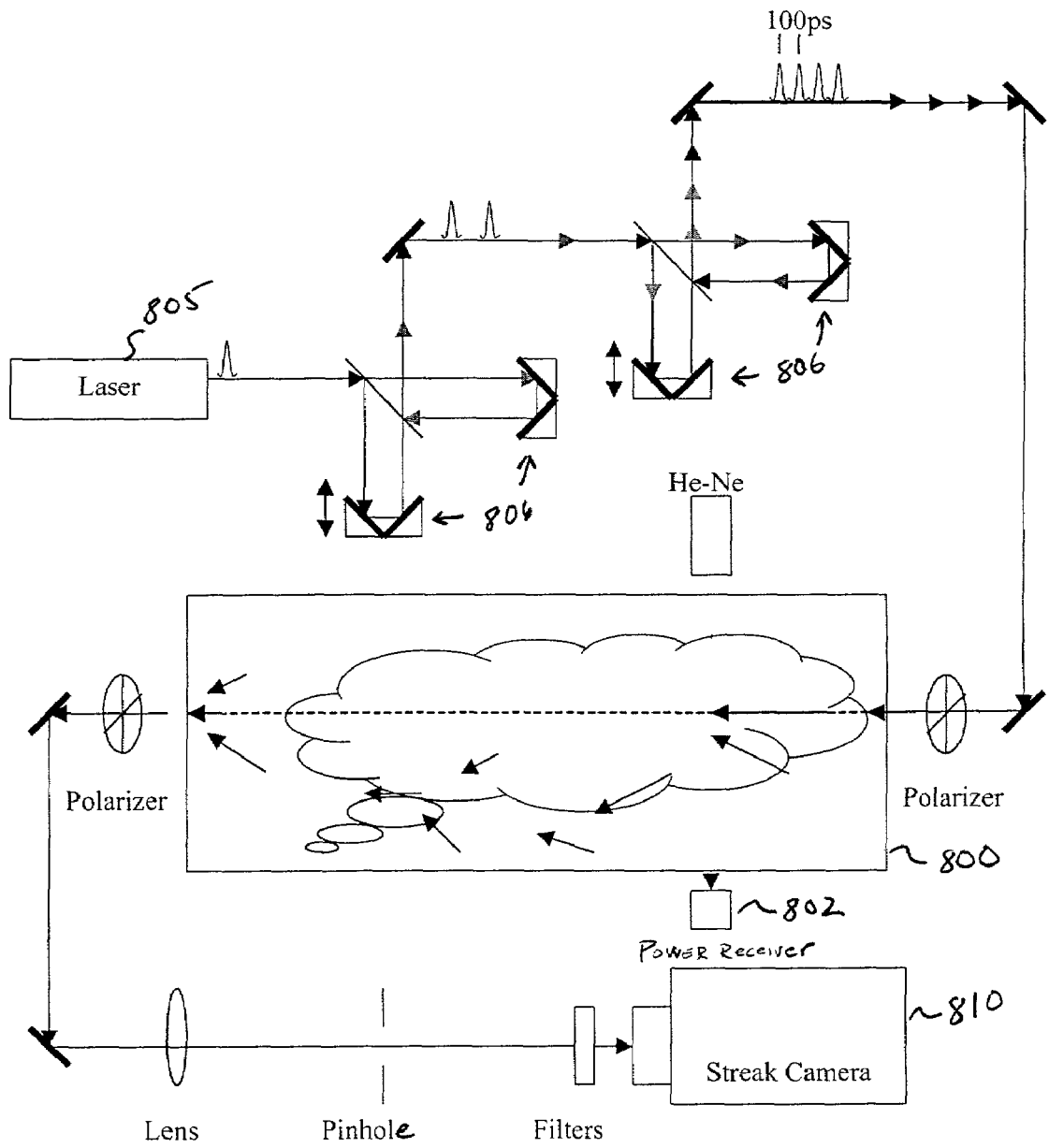
FIG. 8 illustrates a diagram of an experimental embodiment used to demonstrate the feasibility of the methods of the present invention.

An experimental embodiment demonstrating the feasibility of the teachings of the present invention is illustrated in FIG. 8. Free space communication through cloud cover in transmission geometry is simulated in a laboratory using a 6' long×6" diameter cylindrical cloud chamber 800. A nebulizer and a fog generator are used to simulate cloud and fog in the chamber 800. A He—Ne laser 801 and a power receiver 802 are arranged to simultaneously monitor the density of fog and estimate the beam attenuation. A laser 805 (e.g., a colliding pulse mode-locked dye laser) generating 100 fs optical pulses at a 82 MHz repetition rate is used as the light source.

Figure 10:
FIGS. 10A and 10B illustrate a streak image of the 4-pulse signal recorded with a polarization filter set to collect the parallel component, and a corresponding digitized temporal profile.
Figure 10:
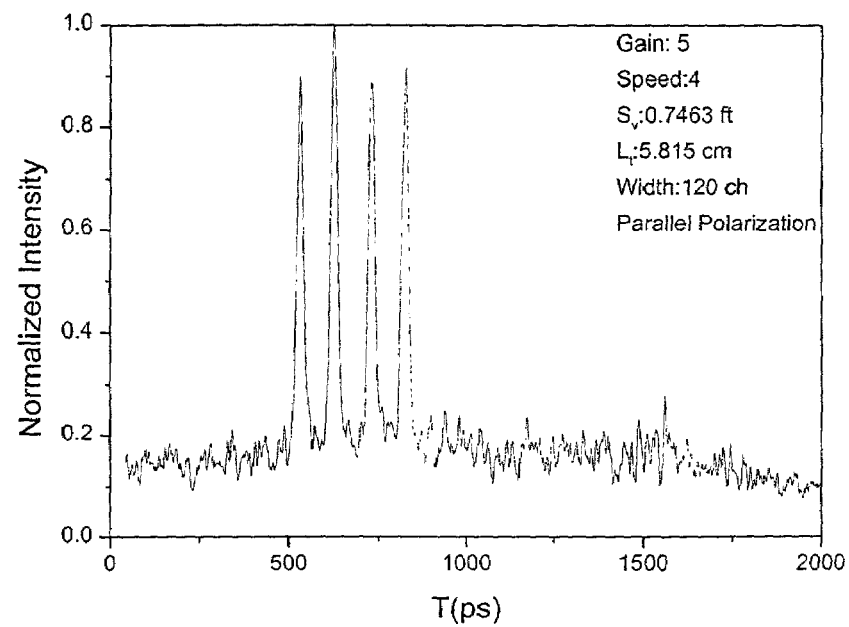
Figure 11:
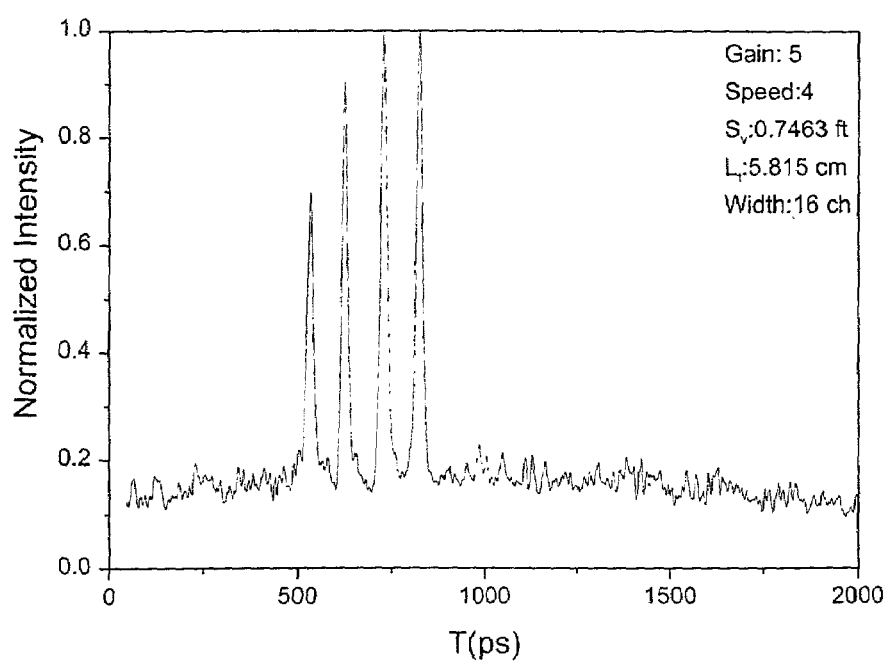
FIGS. 11A and 11B illustrate a streak image of the 4-pulse signal processed with an equivalent of a spatial filter of width 16 channels, and a corresponding normalized and digitized temporal profile.

Two stages of a combination of beam-splitters and retro-reflectors 806, as illustrated in FIG. 8, split a pulse from the laser 805 into a sequence of four pulses with a 100-ps separation between the consecutive pulses. This 4-pulse sequence is used as a signal to represent 10 GHz pulse-coded train. A streak camera 810 senses the signal transmitted through the cloud chamber 800. The path length through the cloud chamber is 6 ft (1.83 m) and the transport mean free path, $l_t$ is 5.815 cm. A polarization gate filter and a spatial filter are implemented to discriminate against diffusive light. The results of the experiment are illustrated in FIGS. 9–11.

FIG. 9(A) illustrates the streak image recorded with a wider slit (120 channels) and without the polarization gate. The 4 pulses appear as 4 dots along the horizontal direction (time axis), and the background noise is evident as haze extending both in the horizontal and vertical (space axis) directions. Corresponding temporal intensity profiles appear in FIG. 9(B). FIG. 9(B) illustrates the 4 signal pulses riding on background noise.

Similarly, FIGS. 10(A) and 10(B) illustrate the streak image and the corresponding normalized temporal profile, respectively, when a polarization filter selects out the parallel component of the signal. The background noise is greatly reduced compared to the result illustrated in FIG. 9, which was obtained without using the polarization filter.

Figure 9:
FIGS. 9A and 9B illustrate a streak image of a 4-pulse signal recorded with an equivalent of a spatial filter of width 120 channels and without a polarization gate, and a corresponding digitized temporal profile.
Figure 9:
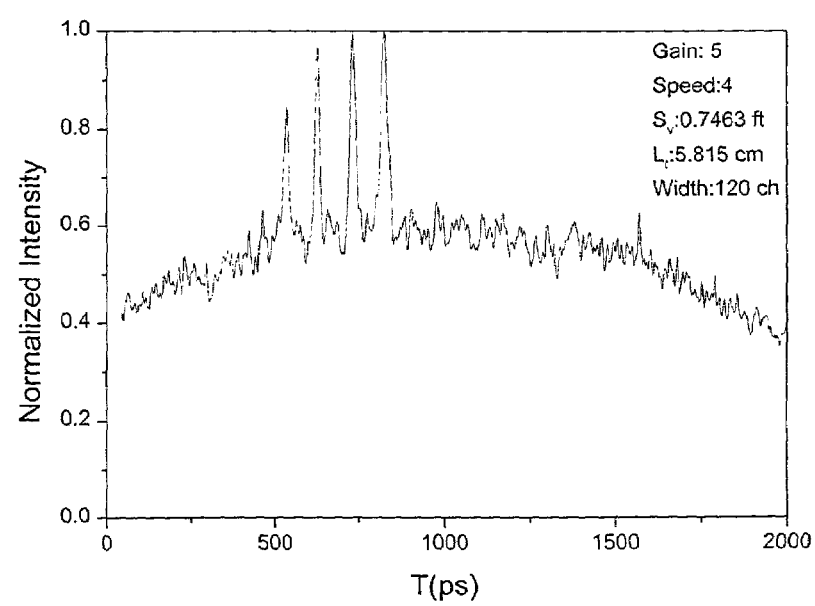

FIGS. 11(A) and 11(B) illustrate the streak image, and the corresponding normalized temporal profile when a space gate is implemented by selecting out a narrower spatial window (16 channels as compared to 120 channels as illustrated in FIG. 9). Again, there is marked reduction in background noise and enhancement in signal-to-noise ratio.

Figure 12:
FIGS. 12A and 12B illustrate a streak image of the 4-pulse signal when both space gating (16 channels selected) and polarization filtering (parallel component chosen) are implemented, and a corresponding normalized and digitized temporal profile.
Figure 12:
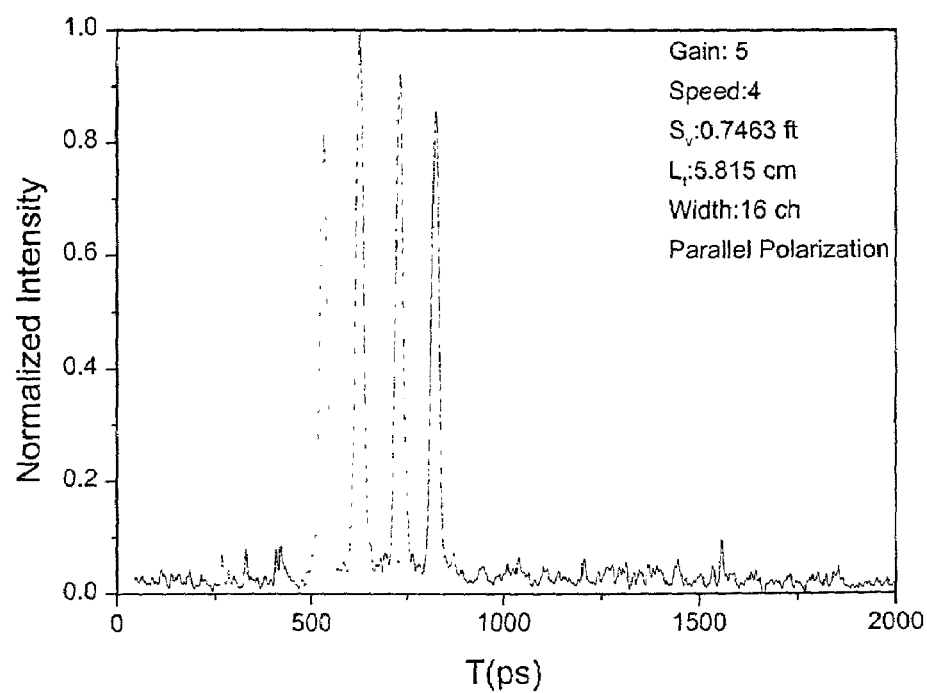

FIGS. 12(A) and 12(B) illustrate a normalized temporal profile when both space gating (16 channels selected) and polarization filtering (parallel component chosen) are implemented. By utilizing both space gating and polarization filtering, the background noise is minimal in this profile as compared to the profiles illustrated in FIG. 9(B), FIG. 10(B), and FIG. 11(B). The results of this laboratory model cloud experiment demonstrate the effectiveness of the methods proposed in the present invention to improve the S/N in optical signal transmission through a scattering medium for line-of-sight wireless optical communication.

Figure 13:
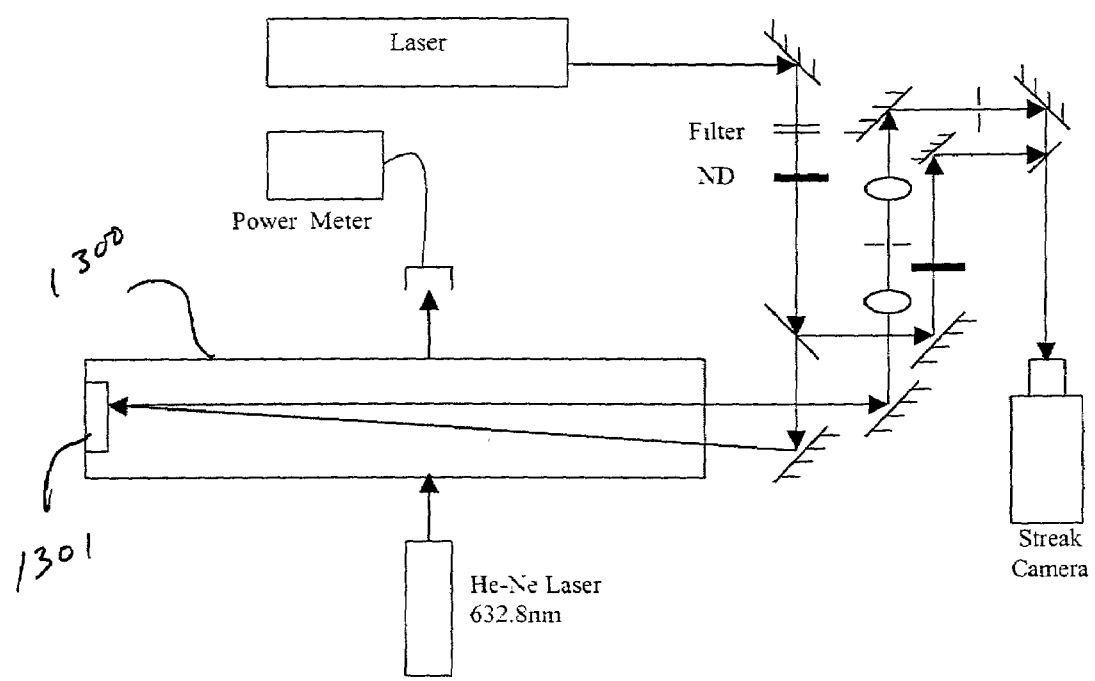
FIG. 13 is a diagram illustrating an experimental arrangement for a laboratory scale cloud model experiment using back-propagation geometry.
Figure 14:
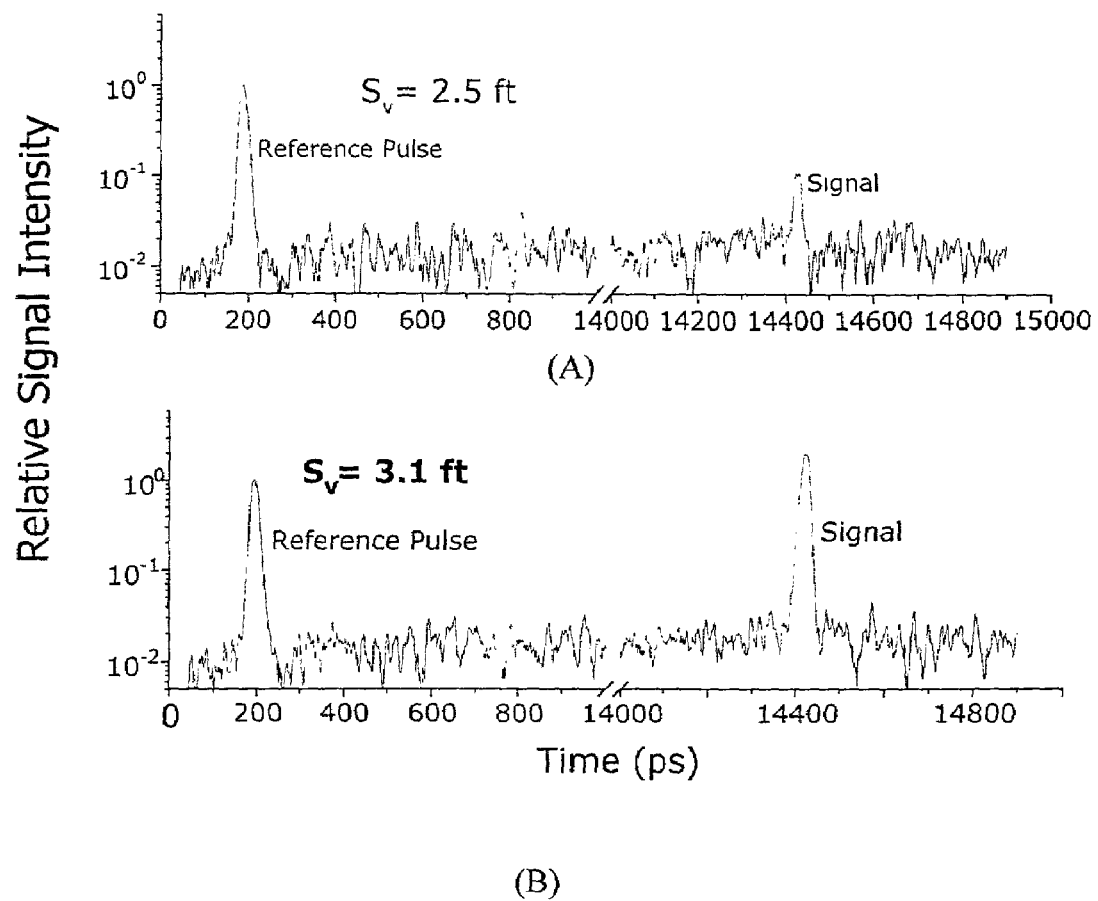
FIGS. 14A and 14B are graphs illustrating temporal profiles of the back-propagating pulse in the cloud chamber for visibility $S_v$ of 2.5 ft and 3.1 ft, respectively.

A second experimental embodiment, illustrated in FIG. 13, allows carrying out of the model cloud experiment with backscattering geometry. A reflecting mirror 1301 positioned at an end of the cloud chamber 1300 serves as a target from which a pulse of light back-propagates after being incident through scattering media with visibilities, $S_v$ of 2.5 ft and 3.1 ft that correspond to $l_T$ of 0.64 ft and 0.79 ft, respectively. The round trip path is 12 ft (3.66 m) leading to an $L/l_T$ of 18.7 and 15, respectively. Only spatial filtering is used to sort out the ballistic and snake components. The initial result of this back-propagation experiment is illustrated in FIG. 14. The signal reflected from the mirror is several times stronger than the background noise due to multiple scattering in the cloud chamber and background of natural light.

The use of absorption to enhance the magnitude of early light relative to the diffusive light reduces the intensity of both the early light and the diffusive light propagated through a turbid medium. However, diffusive light is absorbed more than ballistic light because diffusive light travels a longer path in the medium than the early light (i.e., an average distance of $L^2/2l_t$, when the ballistic light travels through a distance of L).

Figure 15:
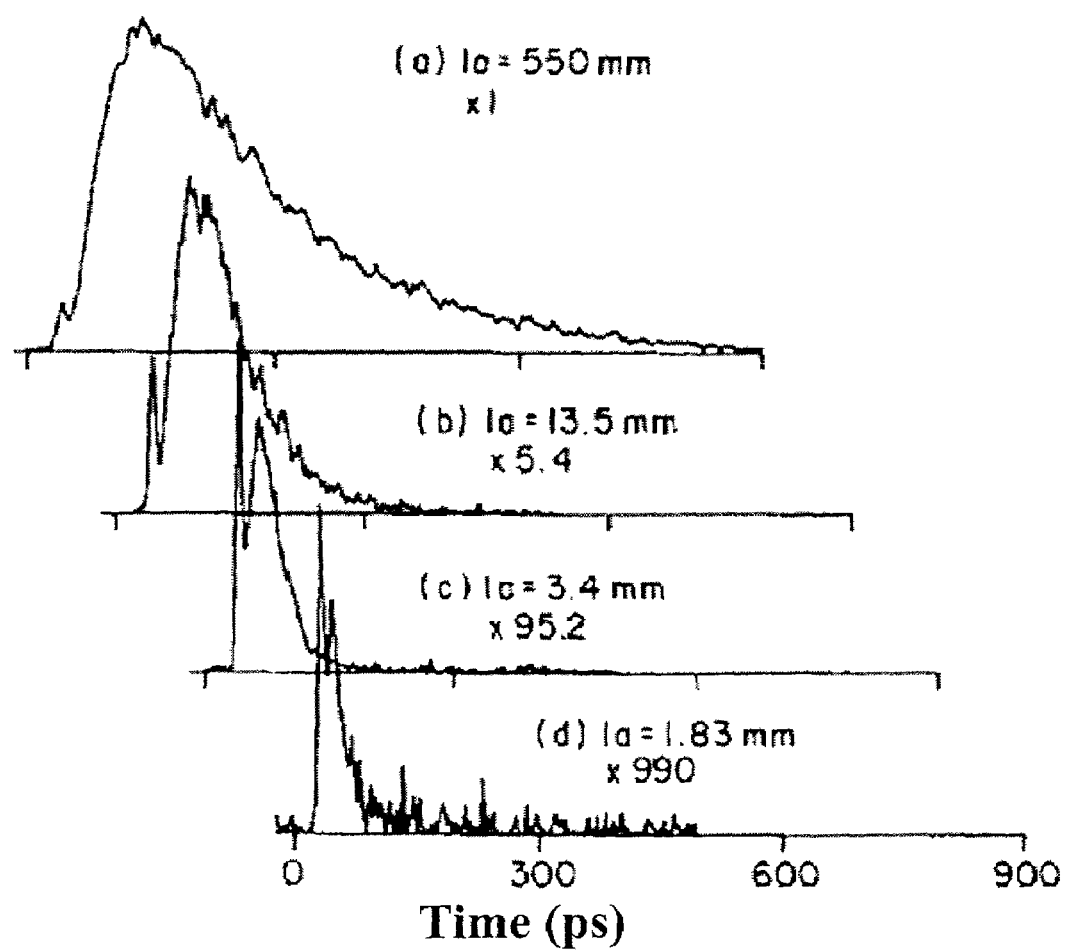
FIG. 15A is a graph illustrating temporal profiles of pulses transmitted through a highly scattering media for different absorption lengths of the host media.
FIG. 15B is a graph illustrating an absorption spectrum of water in the 800–1600 nm spectral range.

The turbid medium used in the experiment was a suspension in water of 0.3% concentration of latex beads of 0.296

μm diameter held in a 50-mm diameter ×10-mm thick glass cell. A beam of 620-nm, pulse width 100-fs, 82 MHz pulses from a colliding-pulse-mode locked dye laser was launched into the medium. The temporal profiles of photons emerging within 3 mrad of the incident direction were measured by a synchroscan streak camera. The absorption by the host medium was increased by adding Malachite Green, an absorbing dye, in the medium. Temporal profiles of the transmitted pulses for different absorption lengths are illustrated in FIG. 15(A). As can be seen from the transmitted pulse profiles in frames (a)–(d), both the ballistic and diffuse light intensities decreased as the absorption increased, but the intensity of the diffuse light decreased much faster, so that the relative magnitude of the ballistic light was significantly enhanced.

Figure 15B:
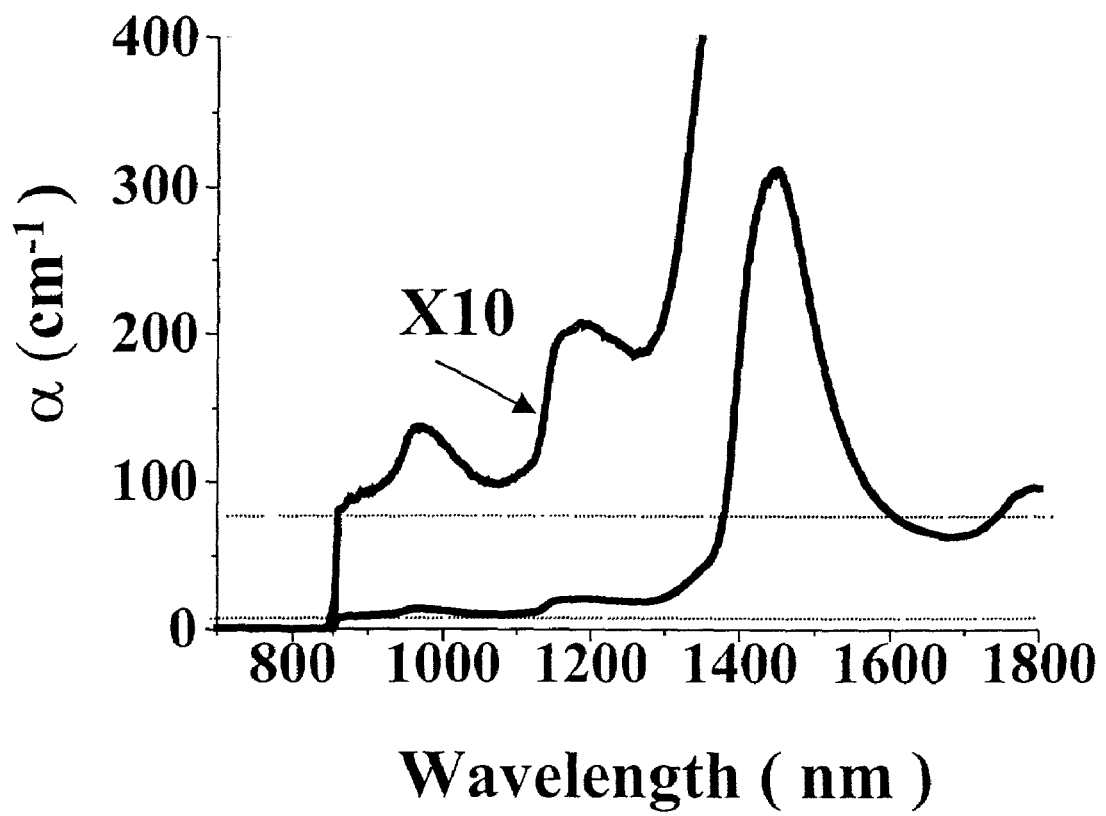

The enhancement of the magnitude of early light relative to the diffusive light is much more pronounced if the scattering particles, as distinct from the intervening medium itself, are the absorbers. This is the situation that exists when transmitting a light signal through a cloud. Water droplets in the cloud are scatterers that will absorb light if its wavelength happens to be in or near resonance with absorptive transitions in water as illustrated in FIG. 15(B) for the 800–1600 nm range. Tuning into an appropriate wavelength in the 1300–1600 nm water absorption band will reduce the diffusive light over the ballistic and snake components. While wavelength selection has been described with reference to absorption in water particles, this same principle applies to wavelength selection when dealing with any other environmental constituents that may scatter the light signal.

The following part of the present invention discloses a theoretical computation of temporal profiles of a photon (early and diffusive components) distribution function. When a receiver is located far ($L \gg l_t$) from the transmitter, the early light components are much smaller than the diffusive components. Currently there are no analytical techniques to calculate the profiles of early light components. Even the computation intensive Monte-Carlo simulation method is inadequate at long distances involved in line-of-sight optical communication due to the large statistical fluctuations. Hereinbelow, a novel analytical method for solving the Boltzmann radiative transport equation in an infinite uniform medium is disclosed. The algebraic expression of the spatial cumulants of the photon distribution function I(r, s, t) at any time and angle between the transmitting and receiving directions, for both unpolarized and polarized light, exact up to an arbitrary high order of cumulant is derived. This method makes it possible to compute the photon distribution in an infinite uniform turbid medium quickly with high accuracy and provides a reliable estimate of the early light components at long distances.

An analytical solution of the time-dependent Boltzmann radiative transport equation that will enable calculation of an entire profile of the transmitted/scattered radiation pulse has been pursued by researchers for many years. A novel approach to an analytical solution of this equation has applications in a broad variety of fields. Currently, the diffusion approximation fails at early times when the distribution is still highly anisotropic; numerical approaches, including the Monte Carlo method, are the main tools for solving the Boltzmann radiative transport equation. A detailed solution of a five-dimensional Boltzmann transport equation using a predominantly numerical approach, however, leads to extremely long CPU calculation times (e.g. a few months) when source and detector are located far from each other.

The scalar (unpolarized) Boltzmann radiative transport equation, which describes photon scattering in a turbid medium, is given by:

$$\partial I(r,s,t)/\partial t + cs \cdot \nabla_r I(r,s,t) + \mu_a(r)I(r,s,t) = \mu_s(r)\int P(s,s',r)[I(r,s't) - I(r,s,t)]ds' + \delta(r-r_0)\delta(s-s_0)\delta(t-0) \quad (5)$$

where, the fundamental scattering parameters are the scattering rate $\mu_s(r)$; the absorption rate $\mu_a(r)$; the differential angular scattering rate $\mu_s(r) P(s', s, r)$; and the speed of light c. The light intensity distribution function, I(r, s, t), is the solution of this transport equation, as functions of position r (3D), direction s (2D), and time t, when a pulsed light source is located at $(r_0, s_0, t=0)$. I(r, s, t) is the quantity directly related to experimental measurements. When the phase function depends only on the scattering angle in an isotropic medium, the phase function is expanded in Legendre polynomials as $$P(s,s')=(1/4\pi)\Sigma a_l P_l[\cos(s \cdot s')] \quad (6)$$

No other restriction on the phase function need be made.

The analytical approach of the present invention is called the cumulant expansion. The concept of "cumulant" will be explained below using a 1D case.

A random variable x, with a probability distribution function P(x) is used in the cumulant expansion. Instead of using P(x) to describe the distribution, the nth moment of x is defined by, $<x^n> = \int x^n P(x)dx$, and a corresponding nth cumulant $<x^n>_c$ is defined by $$\exp\left(\sum_{n=1}^{\infty} <x^n>_c (it)^n/n!\right) = <\exp(itx)> = \sum <x^n>(it)^n/n!.$$

The first cumulant $<x>_c$ gives the central position of x. The second cumulant $<x^2>_c$ gives the half-width of the distribution. The higher cumulants are related to a detailed shape of the distribution. $<x^3>_c$ describes the skewness, or asymmetry of the distribution, and $<x^4>_c$ describes the "kurtosis" of the distribution, that is, the extent to which it differs from the standard bell shape associated with the normal distribution function, and so on. Therefore, the cumulants describe the distribution in an intrinsic way by subtracting the effects of all lower order moments.

In a 3D case, a first cumulant has 3 components, a second cumulant has 6 components, and so on. This derivation of the cumulant expansion is derived as follows.

First, the distribution in direction space, $F(s, s_0, t) = \int dr I(r,s,t)$ on a spherical surface of radius 1 is derived. The kinetic equation for $F(s, s_0, t)$ is obtained by integrating equation (5) over the entire spatial space r. The spatial independence of $\mu_s$, $\mu_a$, and P(s', s) retains translation invariance. Thus the integral of equation (5) obeys Equation 7:

$$\partial F(s,s_0,t)/\partial t + \mu_a F(s,s_0,t) + \mu_s[F(s,s_0,t) - \int P(s,s')F(s',s_0,t)ds'] = \delta(s-s_0)\delta(t-0) \quad (7)$$

In contrast to equation (5), if $F(s, s_0, t)$ is expanded in spherical harmonics, its components do not couple with each other. Therefore, it is easy to obtain the exact solution of equation (7):

$$F(s, s_0, t) = \exp(-\mu_a t) \sum_l \frac{2l+1}{4\pi} \exp(-g_l t) \sum_m Y_{lm}(s) Y_{lm}^*(s_0) \quad (8)$$

where $g_l = \mu_s[1 - a_l/(2l+1)]$. Two special values of $g_l$ are: $g_0 = 0$, $g_1 = c/l_r$. In equation (8), $Y_{lm}(s)$ are spherical harmonics normalized to $4\pi/(2l+1)$. Equation (8) serves as the exact Green's function of light propagation in angular space. Since in an infinite uniform medium this function is independent of the source position, $r_0$, requirements for Green's function are satisfied. Specifically, the Chapman-Kolmogorov condition $\int ds' F(s,s',t-t') F(s',s_0,t'-t_0) = F(s,s_0,t-t_0)$ is obtained. In fact, in an infinite uniform medium, this propagator determines all behavior of light propagation, including its spatial distribution, because displacement is an integration of velocity over time. The distribution function $I(r, s, t)$ (the source is located at $r_0 = 0$) is given by $I(r,s,t) = <\delta(r - c\int_0^t s(t')dt')\delta(s(t)-s)>$, where $<\ldots>$ represents the ensemble average in the angular space. A Fourier transform is preformed for the first $\delta$ function, then a cumulant expansion, resulting in:

$$I(r, s, t) = \quad (9)$$

$$F(s, s_0, t) \frac{1}{(2\pi)^3} \int dk \exp\left\{ ik \cdot r + \sum_{n=1}^{\infty} \frac{(-ic)^n}{n!} \sum_{j_n} \cdots \sum_{j_1} k_{j_n} \cdots k_{j_1} < \int_0^t dt_n \cdots \int_0^t dt_1 T[s_{j_n}(t_n) \cdots s_{j_1}(t_1)] >_c \right\}$$

where, T denotes time-ordered multiplication. In Equation (9), sub-index c denotes cumulant. The corresponding term without index c is the moment. Using a standard time-dependent Green's function approach, the moment is given by:

$$< \int_0^t dt_n \cdots \int_0^t dt_1 T[s_{j_n}(t_n) \cdots s_{j_1}(t_1)] > = \quad (10)$$

$$\frac{1}{F(s, s^{(0)}, t)} \left\{ \int_0^t dt_n \int_0^{t_n} dt_{n-1} \cdots \int_0^{t_2} dt_1 \right.$$

$$\int ds^{(n)} \cdots \int ds^{(1)} F(s, s^{(n)}, t - t_n) s_{j_n}^{(n)} F(s^{(n)}, s^{(n-1)},$$

$$\left. t_n - t_{n-1}) \cdots s_{j_1}^{(1)} F(s^{(1)}, s^{(0)}, t - 0) + perm. \right\}$$

where the word "perm." means all $(n!-1)$ terms obtained by permutation of $j_i$, $i=1, \ldots, n$, from the first term. In equation (10), $F(s^{(i)}, s^{(i-1)}, t_i - t_{i-1})$ is determined by Equation (8). Since Equation (10) is obtained using a Green's function approach without making any approximation and the angular Green's function, Equation (8), is exact, Equation (10) provides the exact nth moment of the distribution.

In Cartesian coordinates, three components of s are $[s_x, s_y, s_z]$. For convenience in calculation, however, the components of s in the base of spherical harmonics are used.

$$s = [s_1, s_0, s_{-1}] = [Y_{11}(s), Y_{10}(s), \quad (11)$$

$$Y_{1-1}(s)] = \left[ -\frac{1}{2^{1/2}} \sin\theta e^{+i\phi}, \cos\theta, \frac{1}{2^{1/2}} \sin\theta e^{-i\phi} \right]$$

The recurrence relation of the spherical harmonics is given by:

$$Y_{lm}(s) Y_{1j}(s) = \sum_i Y_{l+i, m+j}(s) <l, 1, m, \quad (12)$$

$$j | l+i, m+j > <l, 1, 0, 0 | l, 0 > i = \pm 1$$

where $<l,1,m,j|l+i,m+j>$ is the Clebsch-Gordan coefficients of angular momentum theory. Using Equation (12) and the orthogonality relation of spherical harmonics, integrals over $ds^{(n)} \ldots ds^{(1)}$ in Equation (10) can be analytically performed.

$$< \int_0^t dt_n \cdots \int_0^t dt_1 T[s_{j_n}(t_n) \cdots s_{j_1}(t_1)] > = \quad (13)$$

$$\frac{1}{F(s, s^{(0)}, t)} \left\{ \sum_l Y_{l, \sum_{m=1}^n j_m}(s) \sum_{i_n} \cdots \sum_{i_1} \frac{2(l - \sum_{m=1}^n i_m) + 1}{4\pi} \prod_{k=1}^n < \right.$$

$$l - \sum_{m=1}^{n-k+1} i_{n-m+1}, 1, \sum_{m=1}^{k-1} j_m,$$

$$j_k \left| l - \sum_{m=1}^{n-k} i_{n-m+1}, \sum_{m=1}^k j_m > <l - \sum_{m=1}^{n-k+1} i_{n-m+1}, 1, 0, 0 \right| l - \sum_{m=1}^{n-k} i_{n-m+1},$$

$$\left. 0 > D_{i_n \ldots i_1}^l(t) + perm. \right\}$$

with $$D_{i_n \ldots i_1}^l(t) = \quad (14)$$

$$\exp(-\mu_a t) \left\{ \int_0^t dt_n \int_0^{t_n} dt_{n-1} \cdots \int_0^{t_2} dt_1 \exp[-g_l(t - t_n)] \exp \right.$$

$$\left. [-g_{l-i_n}(t_n - t_{n-1})] \cdots \exp[-g_{l - \sum_{k=1}^n i_{n-k+1}}(t_1 - 0)] \right\}$$

The result of this integration can be written in the form of $\Sigma \, c \exp(et) \, t^p$. An algorithm to realize the analytical integration of Equation (14) is given as follows.

---

```
ALGORITHM_1:
struct term {      // cexp(et)t^p
          double   c;
          double   e;
          int      p;
          };
```

-continued

```
vector<term> intg(term tt, double bn)    // intg = ∫₀ᵗdt'exp(bₙt') * c exp(et')t'ᵖ
{
    vector<term> vt;
    double e0 = bn + tt.e;
    if (fabs(e0) < 1.e-07) {vt.push_back(term(tt.c/(tt.p+1.), 0, tt.p+1))};    // intg =
ctᵖ⁺¹/(p+1)
    else {
// intg = exp[(bₙ+e)t][ ctᵖ/(bₙ+e) - nctᵖ⁻¹/(bₙ+e)² + n(n - 1)tᵖ⁻²/(bₙ+e)³ . . . +
(-1)ⁿ!] - (-1)ⁿn!
        c0=tt.c/e0;
        vt.push_back(term(c0, e0, tt.p));
        for (int i=tt.p-1; i>=0; i--) {
            c0 = -c0/e0*(i+1);
            vt.push_back(term(c0, e0, i));
        }
        vt.push_back(term(-c0, 0, 0));
        return vt;
    }
}
vector<term> fn(double b[], int n) // ∫₀ᵗ dtₙeᵇⁿᵗⁿ ∫₀ᵗⁿ dtₙ₋₁eᵇⁿ⁻¹ᵗⁿ⁻¹ . . . ∫₀ᵗ² dt₁eᵇ¹ᵗ¹,
b []={bₙ, . . . , b1}
{
    vector<term> pvt;
    pvt.push_back(term(1., 0., 0));
    for(int k=n-1; k>=0; k--) {
        vector<term> vt;
        vector<term>::iterator iter;
        for (iter = pvt.begin(); iter != pvt.end(); iter++) {
            vector<term> iterm = integ(*iter, b[k]);
            vt.insert(vt.end(), iterm.begin(), iterm.end());
        }
    vector<term> cvt;    // combining the common terms
    for(int i=0; i < vt.size()-1; i++) {
        if(vt[i].p != "mark") {
            for(int j=i+1; j <= vt.size()-1; j++) {
                if(fabs(vt[i].e - vt[j].e) < 1.e-07 && vt[i].p == vt[j].p) {
                    vt[i].c += vt[j].c;
                    vt[j].p = "mark";
                } //endif
            } //end j_loop
            cvt.push_back(vt[i]);
        } //endif
    } //end i_loop
    if(vt[vt.size()-1].p != "mark") {cvt.push_back(vt[vt.size()-1])};
    pvt = cvt;
    }
    return pvt;
}
```

Using the above cumulant procedure, the cumulants as functions of angle s and time t up to an arbitrary nth order can be calculated. Then, performing a numerical 3D inverse Fourier transform over k in Equation (9), a distribution function, I(r, s, t), accurate up to nth cumulant, is obtained. This procedure thus enables calculation of ballistic, snake, and diffusive photon profiles.

The above approach has been extended to a solution of the polarized (vector) radiative transport equation (Cai et. al., "Analytical Solution Of The Polarized Photon Transport Equation In An Infinite Uniform Medium Using Cumulant Expansion," Phys. Rev. E 63, 16606 (2001)). The distribution function for polarized light propagation in a scattering medium is given by $I_m(r, s, t)$, with m=I, Q, U, V, the Stokes components of polarization. The index I indicates the total intensity, $I_I=<|E_\parallel|^2+|E_\perp|^2>$, the index Q pertains to the component line polarized along the reference plane, $I_Q=<|E_\parallel|^2-|E_\perp|^2>$, the index U pertains to the component linearly polarized 45° to the reference plane, $I_U=<|E(45°)|^2-|E(-45°)|^2>$, and the index V pertains to the circular polarization, $I_V=<|E_{RIGHT}|^2-|E_{LEFT}|^2>$. The ratio $P_L=I_Q/I_I$, is related to the experimentally measured quantities $I_{\parallel(t)}$ and $I_\perp(t)$, as $PL=(I_\parallel(t)-I_\perp(t))/(I_\parallel(t)+I_\perp(t))$. The corresponding ratio pertaining to circular polarization is $P_C=I_V/I_I=(I_R(t)-I_L(t))/(I_R(t)+I_L(t))$, where $I_R(t)$ and $I_L(t)$ are the intensities of the right and left circularly polarized components, respectively. The analytical solution derived above provides the most detailed description of the light polarization at the position r, along light direction s, as a function of time t, in an infinite uniform medium.

The single scattering parameters are $\mu_s$ (the scattering rate), $\mu_a$ (the absorption rate), which are the same as that in the unpolarized case, and P(cos Θ) (a 4×4 phase matrix on the scattering plane), which is a extension of scalar phase function in an unpolarized case. The above parameters can be analytically calculated using Mie theory for a spherical shaped scatterer, if the drop radius a, wavelength λ and the relative refraction index between the scatterer and host medium, n, are given. For scatterers of other shapes, the single scattering parameters should be numerically calculated. The vector radiative transfer equation for the polarized photon distribution function I(r, s, t) in an infinite uniform medium, from a point pulse light source, $I^{(o)}\delta(r-r_o)\delta(s-s_o)\delta(t-0)$, in fixed coordinates, is given by:

$$\partial I(r,s,t)/\partial t + cs \cdot \nabla_r I(r,s,t) + \mu_a I(r,s,t) = \mu_s \int P(s,s')[I(r,s',t)-I(r,s,t)]ds' + I^{(o)}\delta(r-r_o)\delta(s-s_o)\delta(t-0) \quad (15)$$

Figure 16:
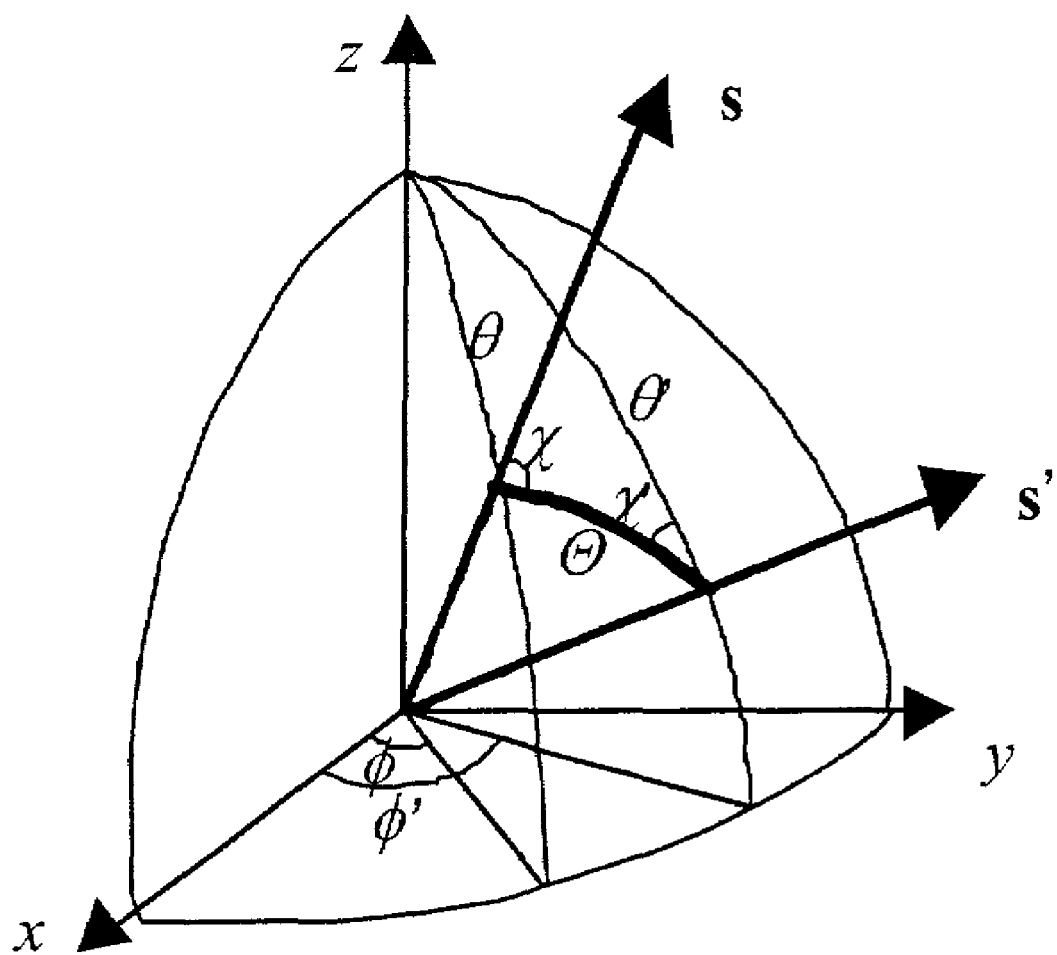
FIG. 16 is a graphical representation illustrating a scattering plane (determined by s and s'), a reference plane for incident light (determined by z and s'), and a reference plane for scattered light (determined by z and s) for scattering polarized light.

When the polarized light is described in a Stokes parameter representation (SP), its intensity has four components: $I^{SP}=[I,Q,U,V]$, where I, Q, U, V all are real numbers. To describe the polarized state in the fixed coordinates, a reference plane must be assigned. Usually, a meridian plane parallel to the z-axis and the light direction, s, is used as the reference plane. In Equation (11) the phase matrix has the following form:

$$P(s,s')=L(\pi-\chi)P(\cos\Theta)L(-\chi') \quad (16)$$

where $P(\cos\Theta)$ is the scattering matrix on the scattering plane, and the matrices $L(-\chi')$ and $L(\pi-\chi)$ are those required to rotate meridian planes before and after scattering onto/from the local scattering plane, as illustrated in FIG. 16, with $$L^{SP}(\alpha) = \begin{bmatrix} 1 & 0 & 0 & 0 \\ 0 & \cos\alpha & \sin\alpha & 0 \\ 0 & -\sin\alpha & \cos\alpha & 0 \\ 0 & 0 & 0 & 1 \end{bmatrix} \quad (17)$$

Since, the transform L creates a major difficulty in solving the vector radiative transfer equation, it is better to use a representation in which L has only the diagonal elements. Therefore, a circular parameter representation of the polarized state (CP) is introduced, which is defined as $I^{CP}=[I_2,I_0,I_{-0},I_{-2}]$, where $I_0=(I+V)/2$, $I_{-0}=(I-V)/2$, $I_2=(Q+iU)/2$, and $I_{-2}=(Q-iU)/2$; or $I^{CP}=T\ I^{SP}$.

$$\begin{bmatrix} I_2 \\ I_0 \\ I_{-0} \\ I_{-2} \end{bmatrix} = \frac{1}{2}\begin{bmatrix} 0 & 1 & i & 0 \\ 1 & 0 & 0 & 1 \\ 1 & 0 & 0 & -1 \\ 0 & 1 & -i & 0 \end{bmatrix}\begin{bmatrix} I \\ Q \\ U \\ V \end{bmatrix} \quad (18)$$

In a circular parameter representation, a rotation of the reference plane through an angle $\alpha$ around the light direction, s, causes $I_m$ to be multiplied by $\exp(-im\alpha)$.

The phase matrix in the circular parameter representation can expanded using the generalized spherical functions, $P_{m,n}^l(\cos\theta)$, instead of expanding the scalar phase function using the associate Legendre functions $P_m^l(\cos\theta)$. The generalized spherical functions are related to the irreducible representations of the rotation group on three non-zero Euler's angles, and the rotation matrix in the angular momentum theory.

Equation (15) solutions are used to extract the encoded information from the detected temporal profiles of the signal. Solving Equation (15) is a direct extension of solving the scalar Equation (5) using the above mentioned cumulant expansion, which is described by the following procedure:

(a) The photon distribution in the light direction space $F(s,s_0,t)$, which is a 4×4 matrix, is first derived using the generalized spherical function expansion. An exact circular parameter propagator in the light direction space, $F(s,s_0,t)$, similar to Equation (8) in the scalar case, is derived.

(b) A formally exact solution of the polarized photon distribution is written as: $I_m^{SP}(r,s,t)=<\delta(r-c\int_0^t s(t')dt')\delta(s(t)-s)>$.

(c) Making a Fourier transform for the first $\delta$-function, and making a cumulant expansion, an expression of $I_m(r, s, t)$, similar to Equation (9) in the scalar case, is obtained.

(d) Using a standard time-dependent Green's function approach, the expression of n-th moment, similar to Equation (10) in the scalar case, is obtained.

(e) Using the recurrent relation of the generalized spherical function and the orthogonality relation of the generalized spherical function, the integral over $ds^{(n)} \ldots ds^{(1)}$ is analytically performed and the expression of n-th moment in the circular parameter representation, similar to Equation (13) in the scalar case, is obtained.

(f) The multiple integration $dt_n \ldots dt_1$ is analytically performed using an algorithm similar to the above-mentioned ALGORITHM_1.

(g) Transferring to the Stokes parameter representation and using a standard cumulant procedure, the exact algebraic expression for the spatial cumulants of the polarized photon distribution functions at any angle and time, up to an arbitrary high order, is obtained.

(h) Performing a numerical 3D inverse Fourier transform over k, the value of $I_m(r, s, t)$ is computed.

Figure 2:
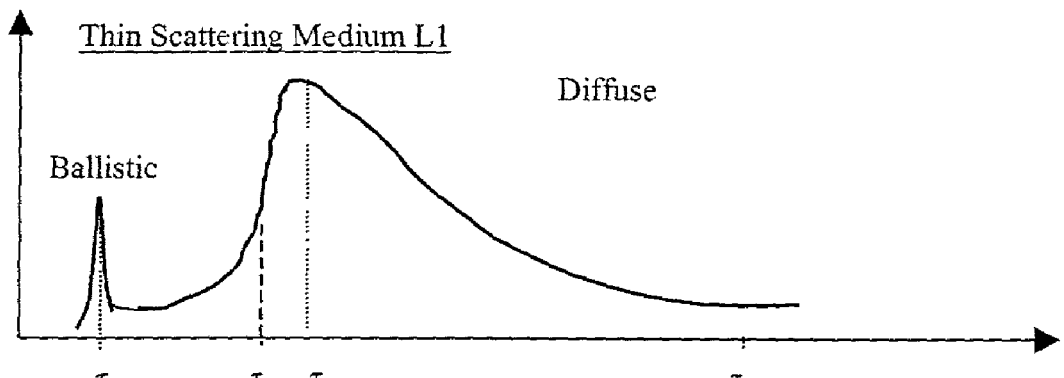
FIGS. 2A–C are graphs illustrating transit times of ballistic and diffusive peaks for different medium thickness.
Figure 2:
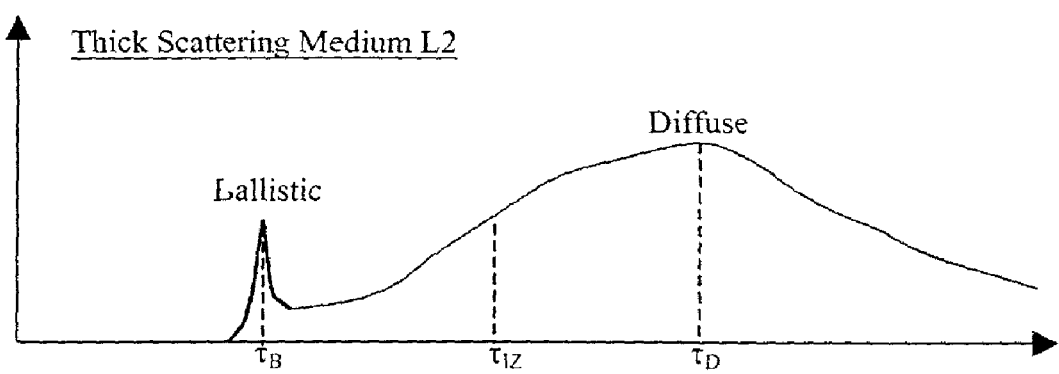
Figure 2:
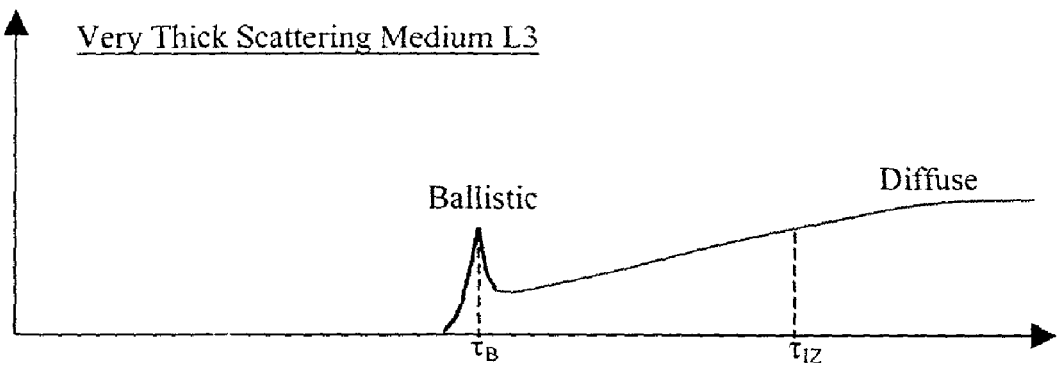
Figure 17:
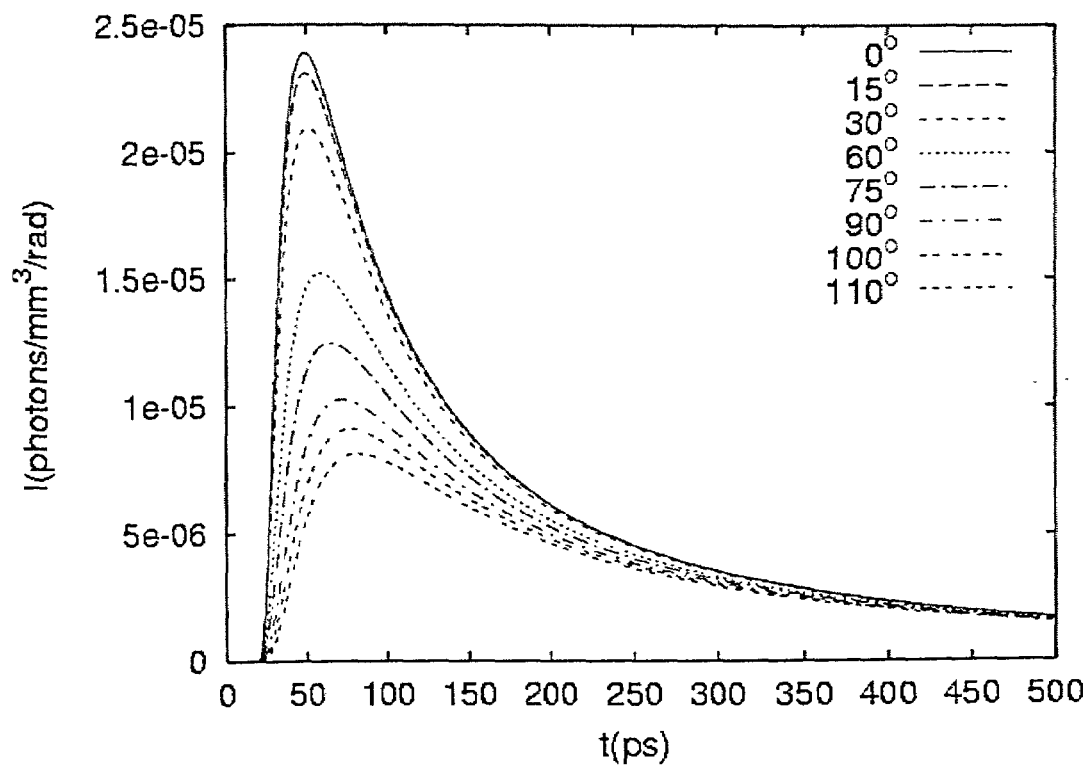
FIGS. 17 and 18 illustrate time profiles of a scalar photon distribution function $I(r,s,t)$ computed using a theoretical formalism of the present invention for different angles of detection when a detector is located at a distance of $5l_t$ and $15l_t$ from the source along the direction of incident light, respectively.
Figure 18:
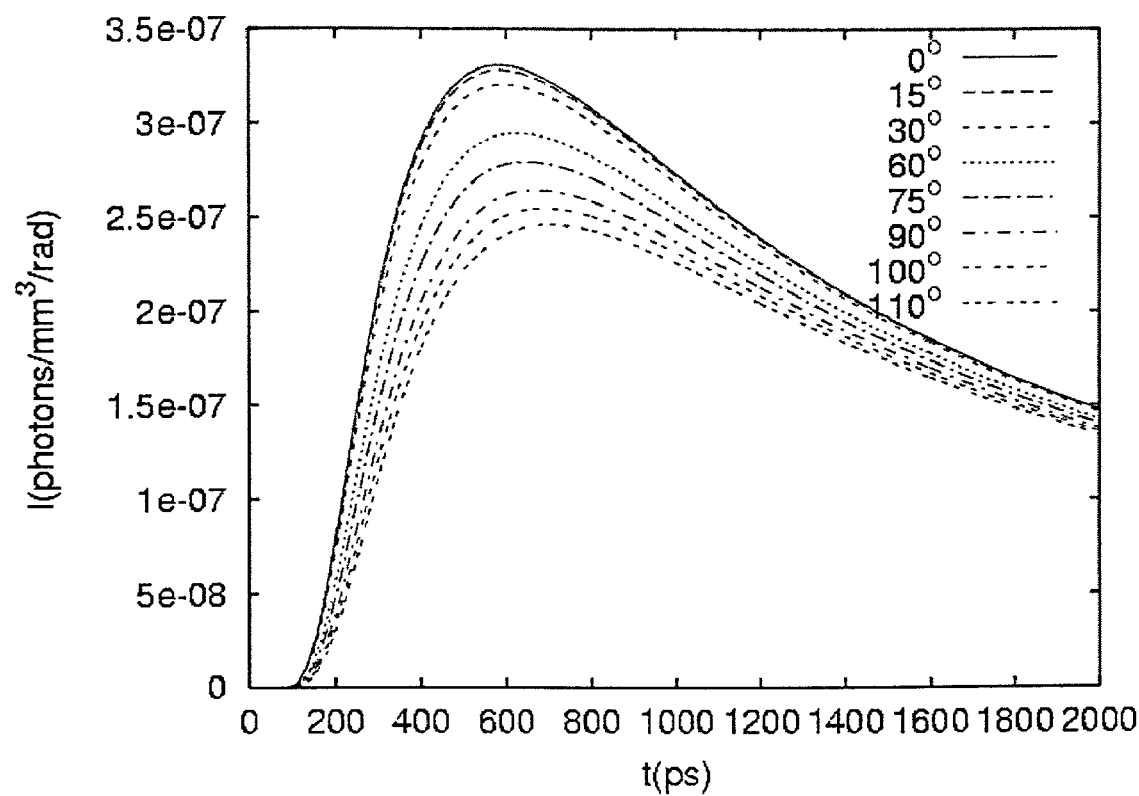

FIG. 17 and FIG. 18 illustrate the computed time profiles of the scalar photon distribution function I(r, s, t) for different angles between the detection direction and the direction of transmission when the detector is located at a distance of $5l_t$ and $15l_t$, respectively, with $l_t=2$ mm, from a source along the direction of incident light. The scattering parameters are obtained from the Mie theory using wavelength $\lambda=625$ nm, radius of scatterer, $\alpha=0.56$ μm, and a relative refract index, n=1.05. The calculation is up to the second order cumulant. An extension of the calculation to higher-order cumulants will yield the time profile of the ballistic light, as illustrated schematically in the profiles of FIG. 2.

As described above, the present invention provides methods of improving wireless optical communication through adverse environmental conditions, such as clouds, fog, smog, and smoke in the atmosphere, and murky water in the sea. The information is encoded using light of appropriate wavelengths, and can be transmitted as a serial train of data, or in parallel as a two-dimensional array.

The present invention also reduces the noise contributed by the diffusive light and the background light, and enhances the relative magnitude of the information-bearing early light relative to the diffusive light, so that the overall signal-to-noise ratio improves. Spatial, temporal, and polarization characteristics of the early and diffusive light, and the optical and spectroscopic properties of the intervening medium and microscale scattering particles suspended in the media, are used to accomplish this objective. The present invention utilizes time gating, space gating, and polarization filtering to sort out early light (the information carrying components) from the diffusive light, and discloses selecting appropriate wavelengths as another advantageous parameter to capitalize on the absorption of light by the intervening medium, and/or by the microscale scattering particles for enhancing the signal-to-noise ratio (S/N).

Also, the present invention discloses a theoretical formalism and provides an algorithm based on the analytical solution of a radiative transfer equation in an infinite uniform medium to extract the information contained in ballistic and snake components of the pulse profile. The algebraic expression of the spatial cumulants of the photon distribution function at any angle and time is valid for both unpolarized and polarized radiation, exact up to an arbitrary high order.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of improving a signal-to-noise (S/N) ratio for a light signal transmitted by wireless optical communication through adverse environmental conditions, the light signal including a snake component and a ballistic component for carrying coded information, and a diffusive component that adds to background noise, the method comprising the steps of:
   encoding information to be transmitted by the light signal, wherein the light signal is one of a serial train of code pulses or a modulated light beam;
   selecting an appropriate wavelength for the encoded light signal;
   transmitting the encoded light signal though the adverse environmental conditions;
   receiving the encoded light signal;
   sorting the received encoded light signal to preferentially select the information carrying components and reduce the diffusive component; and
   detecting the sorted encoded light signal with a photodetector.

2. The method of claim 1, wherein the step of selecting the appropriate wavelength comprises selecting a wavelength to optimize absorption of light such that a magnitude of the snake component and the ballistic component is enhanced relative to the diffusive component.

3. The method of claim 1, wherein the step of selecting the appropriate wavelength comprises selecting a wavelength near the absorption band of water droplets, in the 800 to 1800 nm range.

4. The method of claim 1, wherein the step of selecting the appropriate wavelength comprises selecting a wavelength near the absorption band of active species in the adverse environmental conditions.

5. The method of claim 1, wherein the light signal is one of unpolarized light, linearly polarized light, or circularly polarized light.

6. The method of claim 1, wherein the step of sorting the received encoded light signal comprises at least one of time gating, space gating, or polarization filtering the received light signal.

7. The method of claim 6, wherein the step of space gating is performed by a spatial aperture.

8. The method of claim 6, wherein the step of space gating is performed by a Fourier space gate.

9. The method of claim 6, wherein the step of time gating is performed by at least one of a time-gated detector, a streak camera, a gated intensified CCD camera, or an optical Kerr gate.

10. The method of claim 6, wherein the step of polarization filtering is performed by at least one of a Wollaston Prism or a polarizing cube beam splitter used to split the received light signal into a parallel-polarized component and a perpendicular-polarized component;
   whereby the parallel-polarized component and the perpendicular-polarized component are detected, and their temporal profiles are subtracted to reduce the diffusive component and extract the information carrying components with a higher S/N ratio.

11. The method of claim 10, wherein the temporal profiles of the parallel-polarized component and the perpendicular-polarized component are measured using at least one time-gated detector.

12. The method of claim 10, further comprising the step of introducing an unpolarized light beam into the polarizing cube beam splitter, and using a calibration factor $\xi$ to account for a difference in sensitivity and accuracy of the parallel-polarized component and the perpendicular-polarized component, and determining the value of $\xi$ by requiring $I_A \xi I_B = 0$, where $I_A$ and $I_B$ are intensities of the parallel-polarized component and the perpendicular-polarized component, respectively.

13. The method of claim 10, further comprising the step of extracting the encoded information using a theoretical formalism of the detected temporal profiles, based on an analytical solution of a time-dependent polarized radiative transfer equation.

14. The method of claim 13, further comprising the step of-determining a photon distribution of an infinite turbid medium up to an arbitrary high order using the analytical solution of the time-dependent polarized radiative transfer equation.

15. The method of claim 14, further comprising the step of determining spatial cumulants of a photon distribution function $I(r, s, t)$ at any angle and time for both polarized and unpolarized light signals exact up to an arbitrary higher order.

16. A method of improving a signal-to-noise ratio for a light signal transmitted by wireless optical communication through adverse environmental conditions, the light signal including a snake component and a ballistic component for carrying coded information, and a diffusive component that adds to background noise, the method comprising the steps of:
   encoding information to be transmitted by the light signal, wherein the light signal is encoded in parallel in a 2-D array;
   selecting an appropriate wavelength for the encoded light signal;
   transmitting the encoded light signal though the adverse environmental conditions;
   receiving the transmitted encoded light signal;
   sorting the received encoded light signal to preferentially select the information carrying components and reduce the diffusive component; and
   detecting the sorted encoded light signal with a photodetector.

17. The method of claim 16, wherein the step of selecting the appropriate wavelength comprises selecting a wavelength to optimize absorption of light such that a magnitude of the snake component and the ballistic component is enhanced relative to the diffusive component.

18. The method of claim 16, wherein the step of selecting the appropriate wavelength comprises selecting a wavelength near the absorption band of water droplets, in an 800 to 1800 nm range.

19. The method of claim 16, wherein the step of selecting the appropriate wavelength comprises selecting a wavelength near the absorption band of active species in the adverse environmental conditions.

20. The method of claim 16, wherein the light signal is one of polarized light, linearly polarized light, or circularly polarized light.

21. The method of claim 16, wherein the step of sorting the received encoded light signal comprises at least one of time gating, space gating, or polarization filtering the received light signal.

22. The method of claim 21, wherein the step of space gating is performed by a spatial aperture.

23. The method of claim 21, wherein the step of space gating is performed by a Fourier space gate.

24. The method of claim 21, wherein the step of time gating is performed by at least one of a time-gated detector, a streak camera, a gated intensified CCD camera, or an optical Kerr gate.

25. The method of claim 21, wherein the step of polarization filtering is performed by at least one of a Wollaston Prism or a polarizing cube beam splitter used to split the received light signal into a parallel-polarized component and a perpendicular-polarized component;
  whereby the parallel-polarized component and the perpendicular-polarized component are detected, and their temporal profiles are subtracted to reduce the diffusive component and extract the information carrying components with a higher S/N ratio.

26. The method of claim 25, wherein the temporal profiles of the parallel-polarized component and the perpendicular-polarized component are measured using at least one time-gated image intensified 2-D CCD camera.

27. The method of claim 25, further comprising the step of introducing an unpolarized light beam into the polarizing cube beam splitter, and using a calibration factor $\xi$ to account for a difference in sensitivity and accuracy of the parallel-polarized component and the perpendicular-polarized component, and determining the value of $\xi$ by requiring $I_A \xi I_B = 0$, where $I_A$ and $I_B$ are intensities of the parallel-polarized component and the perpendicular-polarized component, respectively.

28. The method of claim 25, further comprising the step of extracting the encoded information using a theoretical formalism of the detected temporal profiles, based on an analytical solution of a time-dependent polarized radiative transfer equation.

29. The method of claim 28, further comprising the step of-determining a photon distribution in an infinite uniform turbid medium up to an arbitrary high order using the analytical solution of the time-dependent polarized radiative transfer equation.

30. The method of claim 29, further comprising the step of determining spatial cumulants of a photon distribution function $I(r, s, t)$ at any angle and time for both polarized and unpolarized light signals exact up to an arbitrary higher order.

31. The method of claim 1, wherein an improvement in the S/N ratio is achieved by reducing a magnitude of noise contributed by the diffusive component and a background light component, and increasing a relative magnitude of the ballistic component and the snake component over the diffusive component.

32. The method of claim 1, wherein the serial train of code pulses or the modulated light signal light beam is based upon the encoded information.

33. The method of claim 16, wherein the information to be transmitted is encoded into the light signal prior to transmission such that the light signal is based on the information to be transmitted.

* * * * *